(12) United States Patent
Srinivasa et al.

(10) Patent No.: US 7,526,461 B2
(45) Date of Patent: Apr. 28, 2009

(54) SYSTEM AND METHOD FOR TEMPORAL DATA MINING

(75) Inventors: Narayan Srinivasa, Thousand Oaks, CA (US); Leandro G. Barajas, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 374 days.

(21) Appl. No.: 11/199,698

(22) Filed: Aug. 9, 2005

(65) Prior Publication Data

US 2006/0106797 A1    May 18, 2006

Related U.S. Application Data

(60) Provisional application No. 60/628,771, filed on Nov. 17, 2004.

(51) Int. Cl.
  *G06E 1/00* (2006.01)
  *G06E 3/00* (2006.01)
  *G06G 7/00* (2006.01)
(52) U.S. Cl. .............. 706/20; 707/102; 704/4
(58) Field of Classification Search .......... 706/20, 706/21, 48; 707/102; 715/513
  See application file for complete search history.

(56) References Cited

U.S. PATENT DOCUMENTS 6,189,005 B1 * 2/2001 Chakrabarti et al. ........ 707/6
6,931,350 B2 * 8/2005 Zhang ...................... 702/179

2005/0246297 A1 * 11/2005 Chen et al. ................ 706/15

OTHER PUBLICATIONS

R. Agarwal, C. Faloustos and A. Swami, Efficient Similarity Search in Sequence Databases, Proc. Foundations of Data Organization and Algorithms Conf., pp. 69-84, 1993.
B. Cogan, "The power of neural networks," Scientific Computing World, Mar./Apr. 2003.
J. Connor et al., Recurrent Networks and NARMA modeling, in Advances in Neural Information Processing Systems, pp. 301-308,Morgan Kauffman, San Mateo, CA, 1992.
J. L. Elman, Finding structure in time, Cognitive Science, vol. 14, pp. 179-211, 1990.
C. Faloustos, M. Ranganathan and Y. Manolopoulos, Fast Subsequence Matching in Time Series Databases, Proc. Sigmod Record, pp. 419-429, 1994.
C. Faloustos et al., A Signature Technique for Similarity-Based queries, Proc. Compression and Complexity of Sequences Conf., pp. 2-20, 1997.
F. Herrera and M. Lozano, "Adaptation of genetic algorithm parameters based on fuzzy logic controllers," Genetic Algorithms and Soft Computing, pp. 95-125, 1996.
E. Keogh, A Fast and Robust Method for Pattern Matching in Time Series Databases, Proc. of 9th International Conf. on Tools with Artificial Intelligence, 1997.

(Continued)

*Primary Examiner*—David R Vincent
*Assistant Examiner*—Kalpana Bharadwaj

(57) ABSTRACT

A system, method, and apparatus for signal characterization, estimation, and prediction comprising an integrated search algorithm that cooperatively optimizes several data mining sub-tasks, the integrated search algorithm including a machine learning model, and the method comprising processing the data for data embedding, data embedding the processed data for searching for patterns, extracting time and frequency patterns, and training the model to represent learned patterns for signal characterization, estimation, and prediction.

20 Claims, 18 Drawing Sheets

OTHER PUBLICATIONS

E.J. Keogh and M. J. Pazzani, An Enhanced Representation of Time Series Which Allows Fast and Accurate Classification, Clustering and Relevance Feedback, Proc. of AAAI Workshop Predicting Future: AI Approaches to Time Series Analysis, 1998.

J. Pollack, "Connectionism: Past, Present and Future", Artificial Intelligence Review, 1994.

M. T. Rosenstein and P. R. Cohen, Continuous Categories For a Mobile Robot, Proc. of 16th International Conf. On Artificial Intelligence, 1999.

P. Sastry et al., Memory neuron networks for identification and control of dynamical systems, IEEE Trans. on Neural Networks, vol. 5,No. 2, pp. 306-319, 1994.

T. Sauer, J. A. Yorke and M. Casdagli, Embedology, Journal of Statistical Physics, vol. 65, pp. 579-616, 1991.

L. K. Saul and M. I. Jordan, "Attractor Dynamics in Feedforward Neural Networks," Neural Computation, vol. 12, pp. 1313-1335, 2000.

D. R. Seidl and D. Lorentz, A Structure by which a recurrent neural network can approximate a nonlinear dynamic systems, in Proc. Of International Joint Conference on Neural Networks, vol. 2, pp. 709-714, Jul. 1991.

James B. Vitrano and Richard J. Povinelli. (2001), Selecting Dimensions and Delay Values for a Time-Delay Embedding Using a Genetic Algorithm, Proceedings of the Genetic and Evolutionary Computation Conference (GECCO2001), 1423-1430.

R. J. Williams and D. Zipser, A learning algorithm for continually running fully recurrent neural networks, vol. 1, pp. 270-280, Neural Computation, 1989.

M. Wojciechowski, "Discovering Frequent Episodes in Sequences of Complex Events," Proc. of Int Conf on Knowledge Discovery and Data Mining, 1998.

W. Yu and X. Li, "Discrete-Time Nonlinear System Identification Using Recurrent Neural Networks," Proc. of the 42nd IEEE Conf. on Decision and Control, Dec. 2003, Hawaii, USA.

M. A. Potter and K. A. De Jong, "Cooperative Coevolution: An Architecture for Evolving Coadapted Subcomponents," Evolutionary Computation 8(1):1-29, 2000; The MIT Press.

* cited by examiner

SYSTEM AND METHOD FOR TEMPORAL DATA MINING

CROSS REFERENCE TO RELATED APPLICATIONS

This application claims priority to U.S. Provisional Application Ser. No. 60/628,771, titled, "SYSTEM AND METHOD FOR TEMPORAL DATA MINING," filed Nov. 17, 2004, which is incorporated by reference herein in its entirety.

TECHNICAL FIELD

The present disclosure relates to a system and method for temporal data mining. More particularly, it relates to a system and method for temporal data mining by time embedding employing an integrated search algorithm.

BACKGROUND

Data mining is the process of discovering useful patterns in data that are hidden and unknown in normal circumstances. Useful patterns in data for example may disclose information on event frequency, magnitude, duration, and cost. Data mining draws from several fields, including machine learning, statistics, and database design. It uses techniques such as clustering, associative rules, visualization, and probabilistic graphical dependency models to identify hidden and useful structures in large databases.

A special branch of data mining includes temporal data mining (TDM) methods. TDM refers to the application of data mining concepts to finding patterns in time series. There are four components of any TDM method. These include sampling the data (time sampling), encoding or embedding the data, extracting temporal patterns, and then learning the extracted temporal patterns using, for example, a machine learning model.

The time series data to which TDM is applied consists of a set of values collected at discrete points in time. The values are generally numerical, but in some applications may include, for example, colors or other non-numerical data. Typical numerical data may be the occurrence of a machine fault or other machine event, or the duration of a machine downtime event. Numerical data may also include cost data or other financial data.

Temporal data in a time series need not be regularly spaced; for example, events may have occurred, and been recorded, at irregular intervals. Time sampling is a process of imposing regular spacing on the data by binning the data into bins corresponding to regular time intervals, for example, every 30 minutes. How the data is binned depends on the kind of data. For occurrences of events, for example, the binned data may consist of, for each 30 minute interval, a count of how many event occurrences were recorded in the time series for that interval. For cost data, the time series data may be binned by summing the total cost data for that 30 minute interval.

Encoding or embedding the data may entail taking a multidimensional combination of time shifted data to create a representation of the temporal data series in a phase space, whose dimension is the same as the multidimensional combination used to create the representation. The temporal patterns are extracted by applying the encoding or embedding to the data.

A neural network is one example of a model for computing or machine learning. It is based on the architecture of the brain. Processing elements—neurons—accept a finite number of simple inputs and each produces a single predictable output. Outputs from one neuron may be applied to another neuron as input. In this way, the neurons of the neural network are connected together. Neurons may also be referred to herein as nodes.

External inputs may be applied to a subset of the neurons. External outputs may be provided by a subset of the neurons. In addition, there may be hidden neurons in a neural net. These are neurons that are connected to other neurons through their input and output connection, but neither accept external inputs nor produce external output.

Specification of the number of neurons, their connections, and their weights provides a specification of the neural network. Often the specification is augmented with a rule to prescribe how the weights may change in response to inputs and desired outputs provided to the network during a training period. In addition, some inputs may serve to bias the network. That is to say, some neurons/nodes of a neural network may have a bias value. This value helps in modulating the firing of the nodes to inputs. A bias causes a shift in the firing function (typically a sigmoid function) of the node. The system may also learn to adjust the bias values for each of the hidden layer and output layer nodes (which may be referred to as bias weights) in addition to the regular weights on the links between the neurons.

Neural networks may be implemented in software modules. They have been used in pattern recognition applications, and are most effective when there is available a large collection of example patterns for training the neural network. Machine event code or fault code occurrences in a manufacturing facility may provide such a collection. Analysis of event code occurrences as provided in such a collection may be of interest to operators of the manufacturing facility.

Generation of an event code or other signal by a machine in an assembly, manufacturing, or other production plant may entail a downtime event whose duration may impact line throughput. In large scale manufacturing and assembly plants, such as those used in automobile manufacturing, thousands of machines and their machine operators may work simultaneously.

For many reasons, a machine may generate an event code that is sent to a centralized database. In a large plant, when one machine halts, its entire station or more stations may stop operating. Furthermore, in large plants, thousands of event codes may be generated within a short period of time. Event code data that is time stamped data is stored in a database. Analysis of event code time series may provide for prediction of machine downtime and in this way may support preventive maintenance over reactive maintenance.

Several other areas may benefit from robust analysis of time series data, including prognostics and health management of systems such as satellite subsystems, fighter jet subsystems as well as several electrical and electromechanical subsystems. Other potential applications to time series prediction problems include areas such as financial, medical and warranty database mining, and attacks in a computer network or fraudulent transactions in a financial institution.

SUMMARY OF THE INVENTION

This disclosure describes a method, system and apparatus for identifying and predicting temporal patterns from time series data. Using an approach based on an integrated search algorithm, the temporal data mining disclosed herein integrates time sampling, time embedding, pattern extraction and pattern learning into a unified process to provide analysis of time series data.

The method, system, and apparatus for signal characterization employ an integrated search algorithm that cooperatively optimizes data mining tasks. The integrated search algorithm includes a machine learning model. The method includes the steps of processing the data for data embedding, data embedding the processed data for searching for patterns, extracting time and frequency patterns to provide training samples, and training the machine learning model to represent learned patterns for signal characterization according to the training samples.

The method, system and apparatus also include receiving time series data as input to the integrated search algorithm. The steps in the temporal data mining process need not necessarily occur consecutively, and the integrated search algorithm optimization is a cooperative optimization. It may be simultaneous, consecutive, hierarchical, or its order may be further specified to take place in some other fashion as may suit a particular data mining problem. The extracted temporal patterns are output when a fitness value exceeds a threshold fitness value.

Three different embodiments using the above-described integrated search algorithm are disclosed. Two provide hierarchical structure while the third embodiment involves a direct search without the hierarchy present in the first two embodiments.

DESCRIPTION OF THE PREFERRED EMBODIMENT

Figure 1:
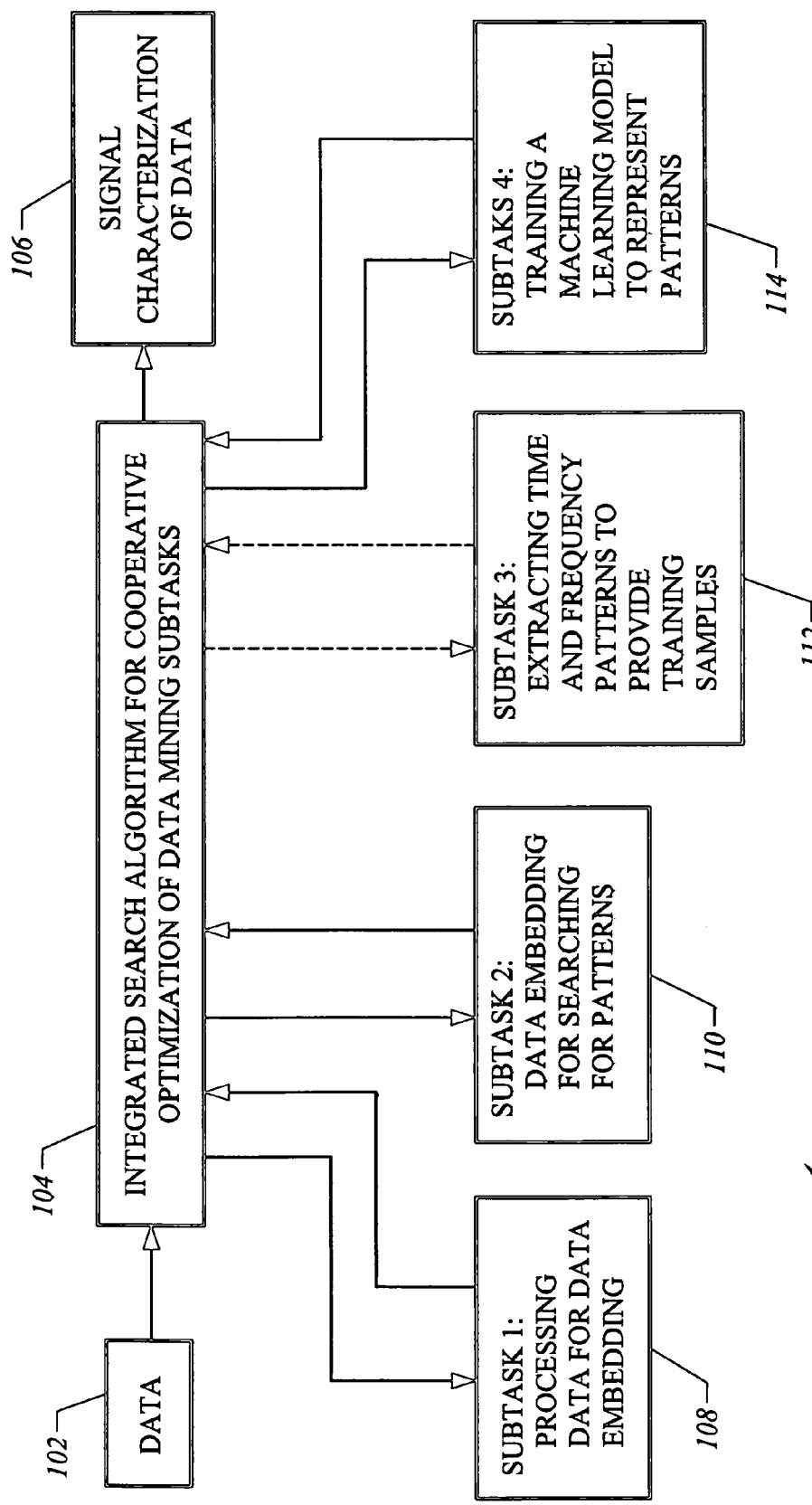
FIG. 1 is a flow chart of a method disclosed herein.

FIG. 1 shows a method 100 according to an embodiment as described herein. In FIG. 1, data is input 102 to an integrated search algorithm 104. As described below beginning with FIG. 10, an embodiment which uses a genetic search algorithm in an integrated search algorithm approach is employed. However, it will be appreciated that other integrated search algorithms may be utilized, such as, for example, integer programming, an uninformed search such as a list search, tree search, and graph search, an informed search, an adversarial search, a string search algorithm, or a search based on a simulated annealing algorithm.

Again referring to FIG. 1, the following four data mining subtasks are driven by integrated search algorithm 104 to process the data and provide signal characterization, at 106. By signal characterization is meant the process of extracting temporal patterns of significance for modeling, estimation, prediction, and/or analysis of data features embodied in the temporal data series.

Although ordered here, the order of the steps may be changed to accommodate different embodiments, if applicable. Also, other steps may be included. The first data mining subtask 108 is processing the data for data embedding. The next subtask 110 is processing the data for embedding so that searching for patterns may be accomplished. In the third subtask 112 the embedding is used for extracting time and/or frequency patterns to prepare data for training and evaluation of a machine learning model. In the fourth subtask 114 a machine learning model is trained to learn the extracted patterns.

Integrated search algorithm 104 provides cooperative optimization of data mining subtasks. Typically the subtasks have numerical parameters subject to control by integrated search algorithm 104. In an embodiment a subtask may operate without such control. This is shown in FIG. 1 by the dashed lines connecting third subtask 112 with integrated search algorithm 104.

While discussed here with respect to an embodiment utilized in an assembly and/or manufacturing plant, it will be recognized that this technology may have application in any field where temporal data mining is appropriate, such as, for example, finance, inventory management, or computer network analysis. The method disclosed herein may automatically extract temporal patterns for complex time series that are non-stationary, non-periodic, irregular, and chaotic.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Returning now to FIG. 1, input step 102 may further include a step of prefiltering the data. Typically, a temporal data series includes event-time value pairs $(E_1, t_1), (E_2, t_2), \ldots$, where $E_1$ may include, for example, a machine event code along with the duration of the event, and $t_1$ may include the start time of the event. Thus, an example of such time series data as discussed above may be machine downtime occurrences due to some events in the manufacturing process.

Alternatively, a temporal data mining (TDM) task may also be formulated to specifically detect major events such as high computer network load (i.e., samples with large magnitude) with maximum accuracy and minimum false alarm. Data in a time series may also reflect noisy conditions, for example, time periods containing only a few examples of a target class, or the data may have been taken with uneven sampling. Inaccurate logging of times of occurrence may have occurred. Data reflecting noisy conditions may be analyzed by the technology provided herein.

As an example of prefiltering, the data may be selected for downtimes due to those events which are the greatest contributors to manufacturing facility downtime, or selected for those events which occur most frequently, e.g., the top ten contributors. In this way, events with the greatest impact on productivity are examined by the method described herein. Moreover, such prefiltering may provide input data series with better statistical properties than data series which include fewer events.

Returning to discussion of subtask 108, one way to transform the data may be by performing a feature extraction from, for example, event downtimes. In general, a feature is an extracted quantity or quality from the input temporal data series. It may be represented, for example, by the sum, maximum or average downtime during a specified period. Feature extraction may provide for processing of both quantitative data and qualitative data.

Another option may be to transform the data into processed data by adding counts of events, if frequency data is to be analyzed. Event frequency (events per unit time) may thus be derived from binned data using the bin contents (i.e., counts) divided by the bin width (i.e., duration).

In still another use of the method disclosed herein, Mean Time To Repair (MTTR), the quotient between total downtime for an event during a time period and the number of times the event occurred during that time period, can be used instead of or along with frequency and/or downtime. MTTR is a measure of how long, on average, a machine is unavailable for production due to a specific event. MTTR can also be defined for groups of events.

In general, any feature that may be extracted from the input data series in a supervised or unsupervised way may be used in subtask 108 and subsequent subtasks. For example, Mean Time Between Failures (MTBF) may be used. As another example, Mean (part) Count Between Failures (MCBF) may be used.

For simplicity, the bins in the time sampling step are of equal width so that the bin boundaries are evenly spaced in time. The data may be classified also into a small number of classes (typically, four) which may range from non-events to large events, based, e.g., on the duration of the machine downtime for that event. Data transformation in this step may, in another embodiment, include discretization of analog data.

Figure 2:
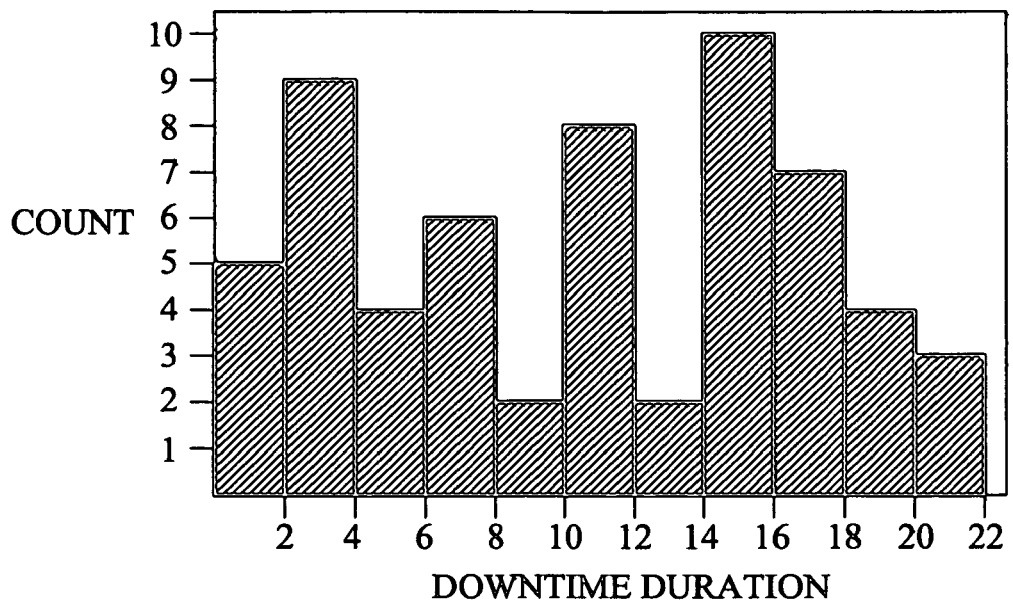
FIG. 2 shows an example of grouped downtime data.

FIG. 2 shows an example of downtime data. This data type may be relevant in manufacturing. In this example, the data is initially grouped into 11 classes, each representing a two hour interval of downtime durations. The first class includes 5 downtime events each of which lasted between 0 and 2 hours. The second class holds 9 downtime events ranging in duration between 2 and 4 hours. Each successive class holds downtime events in a two hour window, continuing to the eleventh class, which counts 3 downtime events each lasting between 20 and 22 hours duration.

The statistics of the data of FIG. 2 may be improved by an agglomerative clustering process. In general, agglomerative clustering is a method for iteratively arranging data into classes or clusters to meet some criteria or maximize some objective function. The agglomerative clustering task can be defined as sequential partitioning of N samples into C clusters in a supervised or unsupervised fashion. The number of clusters C may be less than the number of samples N.

Figure 3:
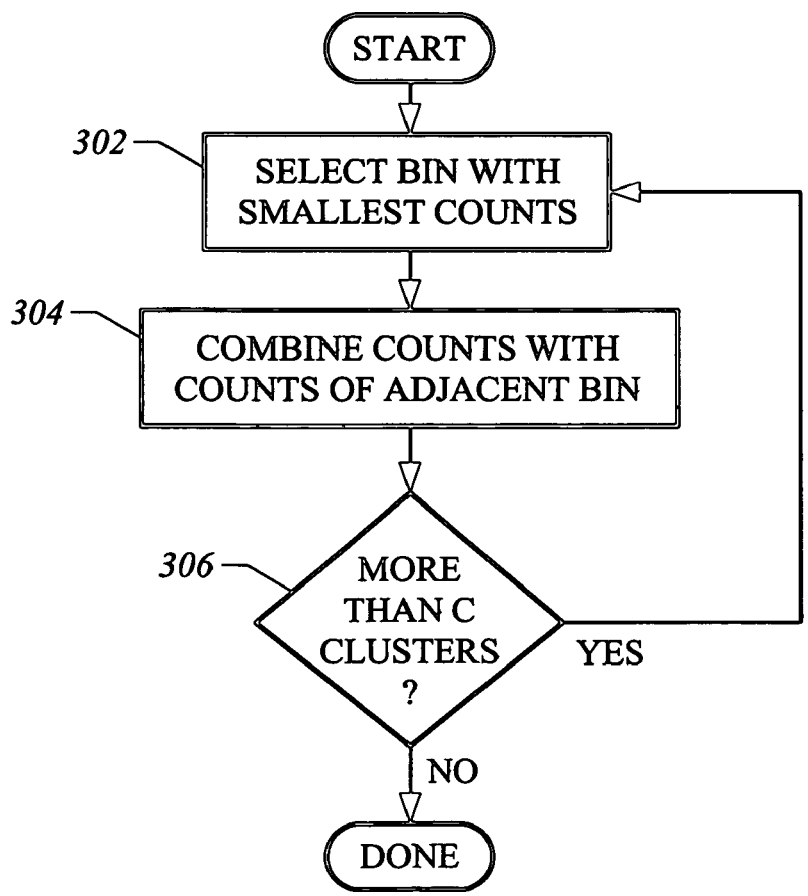
FIG. 3 is a flowchart of an agglomerative clustering process.

FIGS. 2-7 provide illustration of agglomerative clustering. First, as shown in FIG. 2, a histogram of the downtimes within the data set for a given fault is constructed by choosing fixed class boundaries with a respective size (e.g., the class size of 2 hours in FIG. 2). Agglomerative clustering is then applied to the resulting histogram. This process is shown in the flowchart of FIG. 3. FIGS. 4, 5, 6, and 7 illustrate aspects of clustering, as discussed in connection with processing data for data embedding.

The clustering process is initiated by starting with the class with the fewest number of samples 302. This class is merged into a neighboring class 304 based on a similarity measure which is a function of count and downtime.

One such similarity measure may be a Euclidean distance over data features. For example, two classes may be considered similar if the difference between the counts associated with their data is small, or if the difference between the downtime durations associated with their data is small, of if the difference between the MTTR values associated with their data is small. Nonlinear similarity measures (e.g., nonlinear combinations of the above three similarity measures) may also be defined. Other similarity measures appropriate for agglomerative clustering as used herein may be based on distance measures other than Euclidean, such as: City block (Manhattan), Chebyshev, Minkowski, Canberra, Bray Curtis (Sorensen), Angular separation, and Correlation coefficient.

Figure 4:
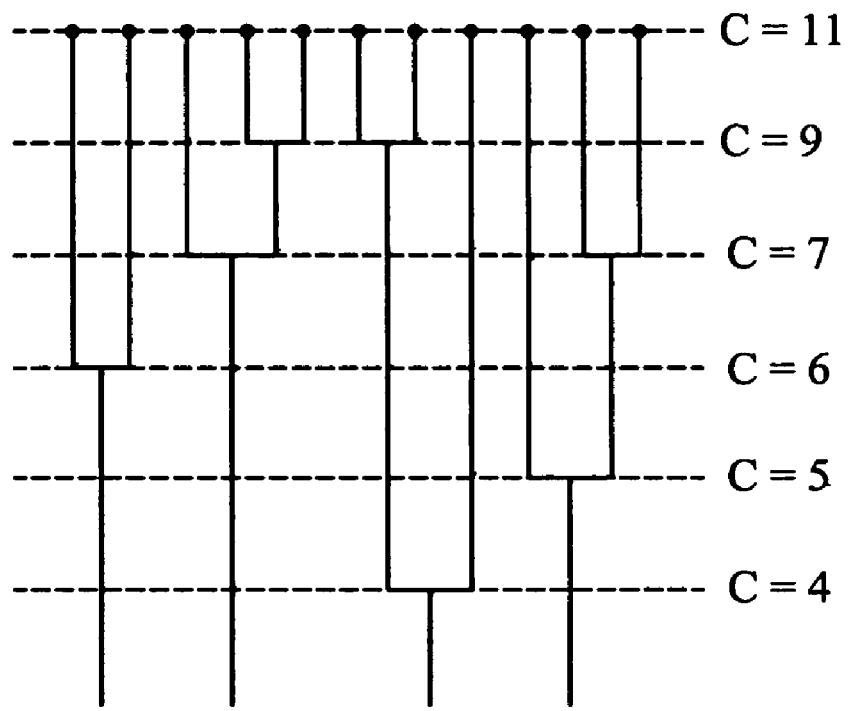
FIG. 4 shows the progression of an agglomerative clustering process with the data of FIG. 2.
Figure 5:
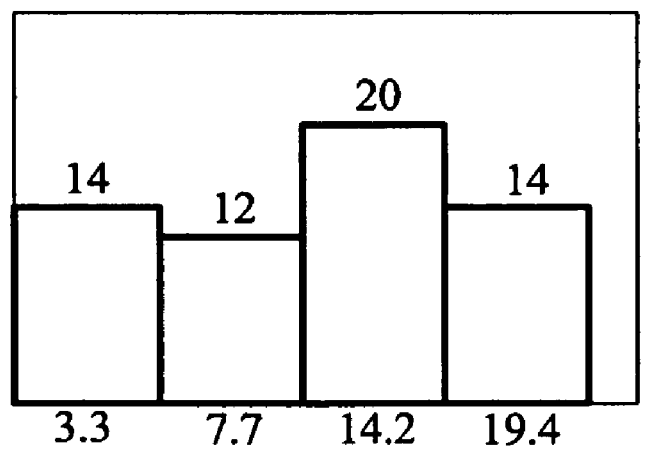
FIG. 5 shows the final clusters and their cluster centers for the data of FIG. 2.

This process is then continued 306 until the desired number of classes is obtained. The progression of the clustering process is shown in FIG. 4. For the example shown in FIG. 2, the final clusters and their cluster centers are shown, for the case where the number of clusters is selected to be 4, in FIG. 5.

Figure 6:
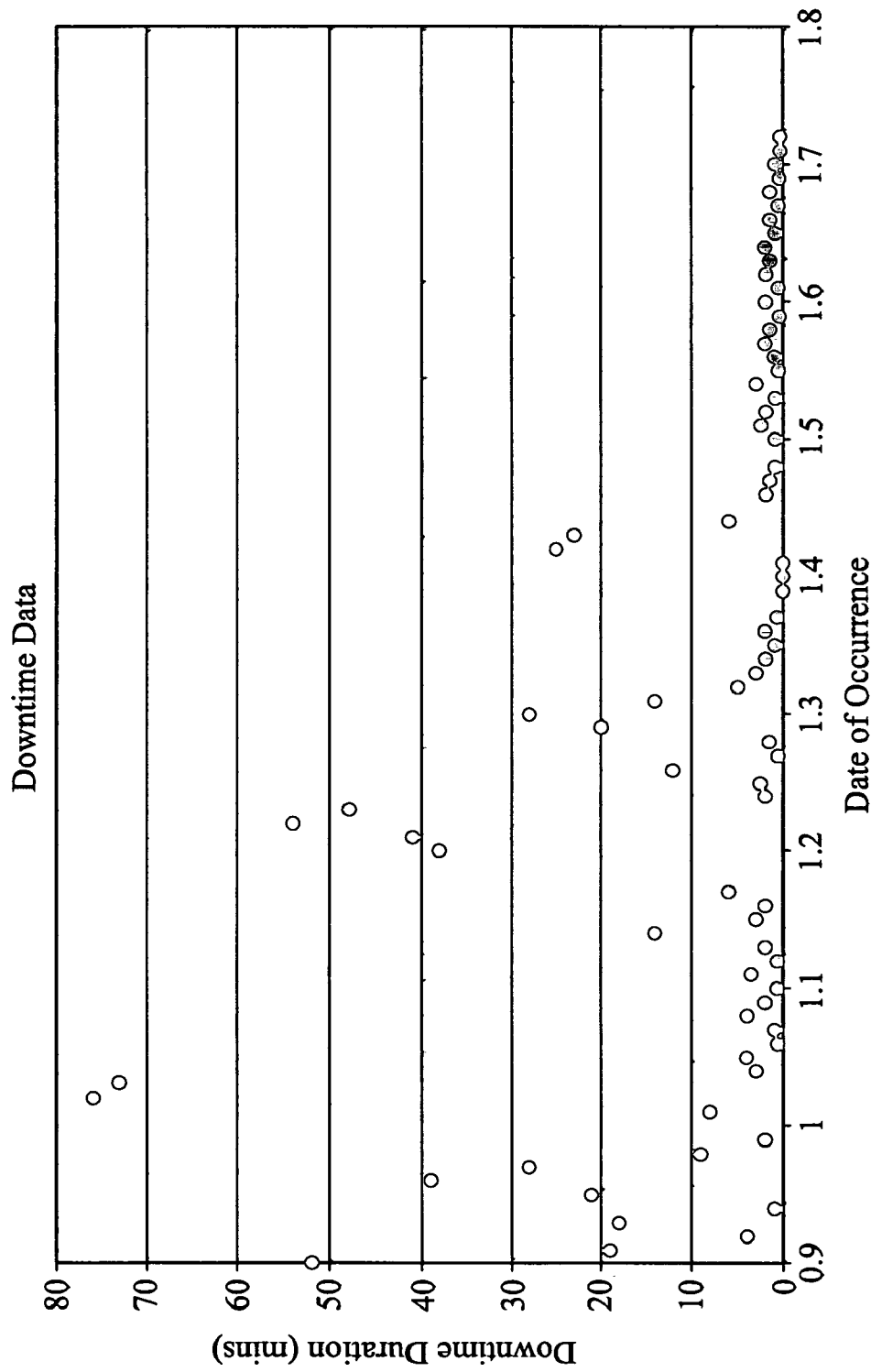
FIG. 6 shows an example of time series data, plotted as time of machine event on the horizontal axis vs. duration of event on the vertical axis.
Figure 7:
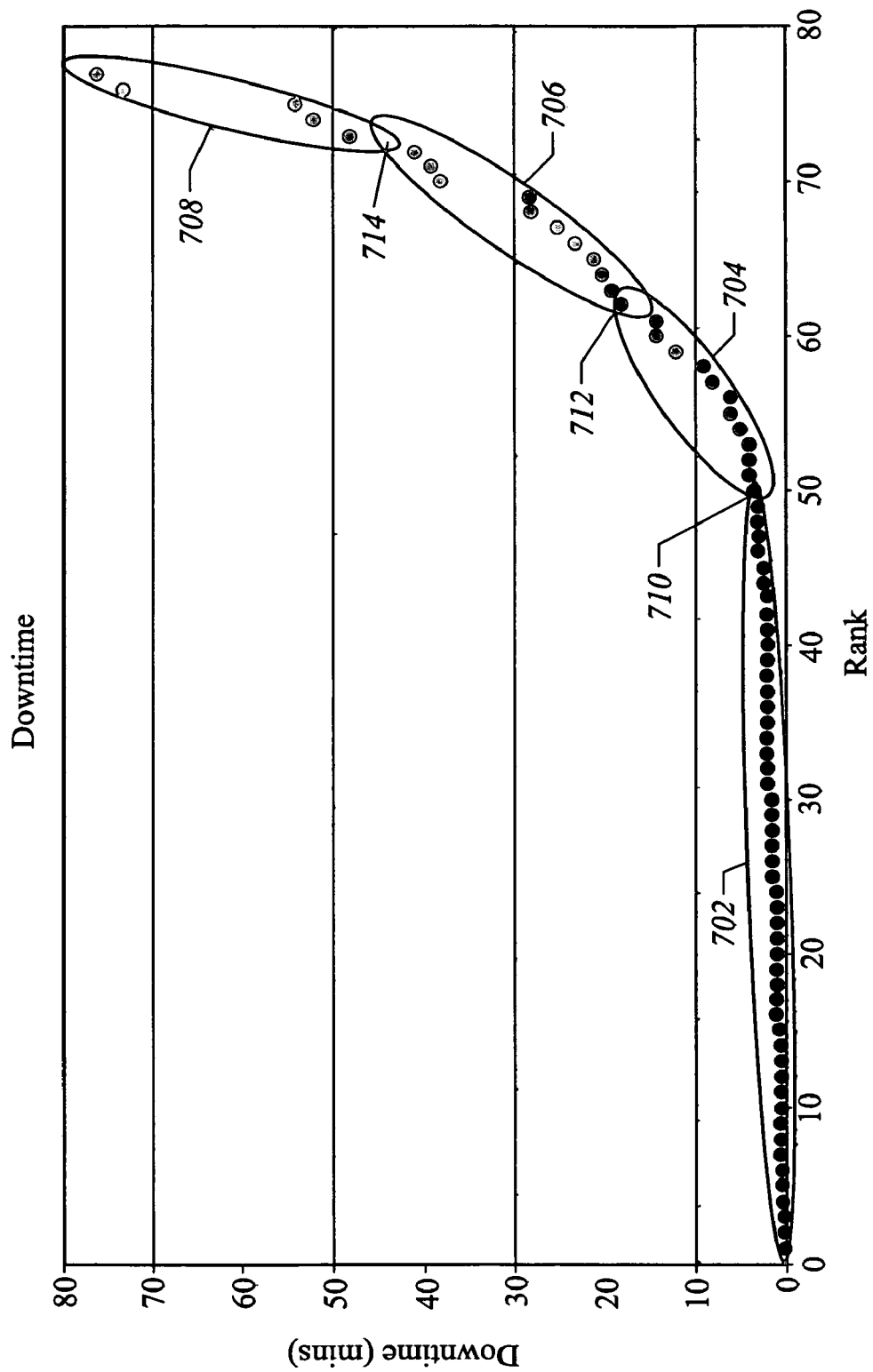
FIG. 7 shows the data of FIG. 6 plotted in order of increasing event duration.

In another example of an agglomerative clustering process, example event code data is shown in FIG. 6. The data is plotted as time of event occurrence on the horizontal axis vs. duration of event on the vertical axis. In FIG. 7, the data is re-plotted in order of increasing event duration. Each point plotted in FIG. 7 may represent a class. An agglomerative clustering procedure may then group neighboring classes into clusters until the desired number of clusters (in this case, four) is reached.

The clustering process may take into account nominal classes of downtime events, e.g., 0-2 minutes in duration for non-events, 2-15 minutes for small events, 15-45 minutes for medium events, and longer than 45 minutes for large events. Ellipses 702, 704, 706, and 708 surround groups of data points in FIG. 7, chosen to best fit the data and respect the nominal class boundaries. As shown in FIG. 7, the clustering process may ensure a good distribution of samples for the four event classes when agglomerative clustering is used.

A mechanism may be provided for computing values for downtime predictions. As seen in FIG. 7, the clustering procedure can still result in class overlaps (e.g., 710, 712, and 714, where two ellipses overlap). This may occur because the similarity measure used for agglomerative clustering does not guarantee, by itself, that the resulting cluster will not straddle a class boundary. To accommodate class overlaps for data at the intersection of two classes (e.g., the data points in 710 and 712 in FIG. 7), the class assignment is typically made based on a Euclidean distance to the class cluster mean.

However, instead of forcing the cluster assignment in this way, an alternative may be to provide predictions for all the desired number of classes with class confidences. This approach may be denoted as multiclass prediction. For example, in FIG. 7, the data point in 710 may be regarded as lying in the non-event class with confidence 40% and lying in the class of small events with confidence 60%. This technique may include predictions with associated confidences for each class. An example of such multiclass prediction is shown in FIG. 8.

Figure 8:
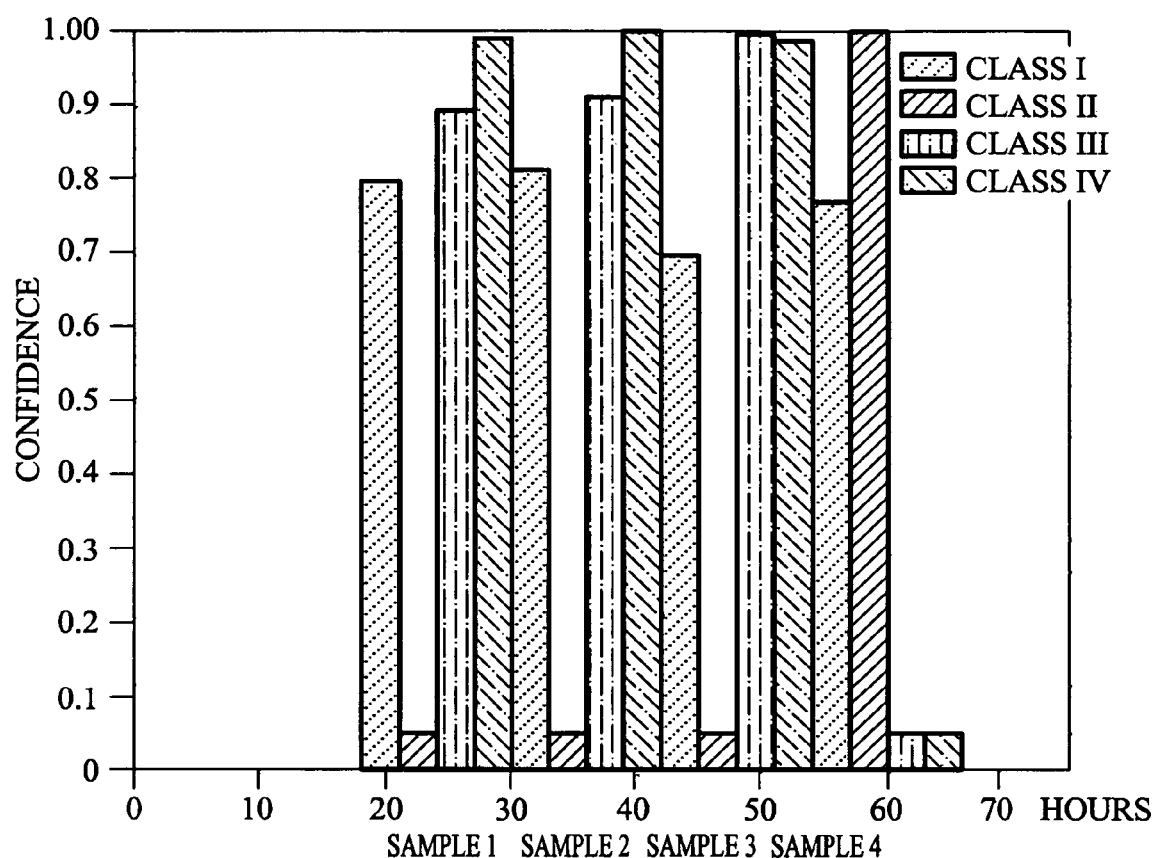
FIG. 8 shows an example of multiclass prediction.

In FIG. 8, four samples are shown, each from a 12-hour wide sampling interval, or bin width. Sample 1 is centered on 24, sample 2 on 36, sample 3 on 48, and sample 4 on 60. The classes, with their confidences, are plotted for each sample, as shown in the figure. For example, class I for sample 1 has a confidence of about 80%, class II has confidence of about 5%, and so on.

With multiclass prediction, by adopting a weighted average of the class confidences much like fuzzy centroid estimation techniques, this approach may be used for producing actual downtime value predictions. Determination of class confidences is discussed further below in connection with FIG. 17.

A user may have a number of choices in the way fault data is utilized for prediction purposes. Multicriteria prediction may provide for greater adaptability in the kinds of predictions to be made from the data. There may be, for example, three criteria based on sampling period integration. As discussed below, the sampling period calculation may be based on a genetic algorithm approach. However, the user has a choice about how the data within a sampling interval can be utilized. Choices may include: computing the average, mode, or median downtime of all the samples within the interval; using just the peak downtime value; and finally using the cumulative downtime within a sampling interval.

Three additional criteria for prediction may also be devised based on the focus of importance for the prediction task. A first option may be based on the downtime classes, e.g., non-events to large events. A second option may be based on the number of event occurrences. A third option may use the Mean Time To Repair (MTTR). In prediction results, events may be sorted in a decreasing order using a criterion selected for both the sampling interval and the type of data prediction. Predictions may be then made on events that can be modeled (if, for example, there are more than 50 samples).

In an agglomerative clustering approach, the number of input classes may typically be defined a priori for the algorithm. In some circumstances, depending on the statistical distribution of the data, selection of the number of classes at the outset may result in a highly uneven number of samples for the defined classes, which may result in poor learning of temporal patterns. This may be avoided by use of a dynamic class allocation algorithm.

Figure 9:
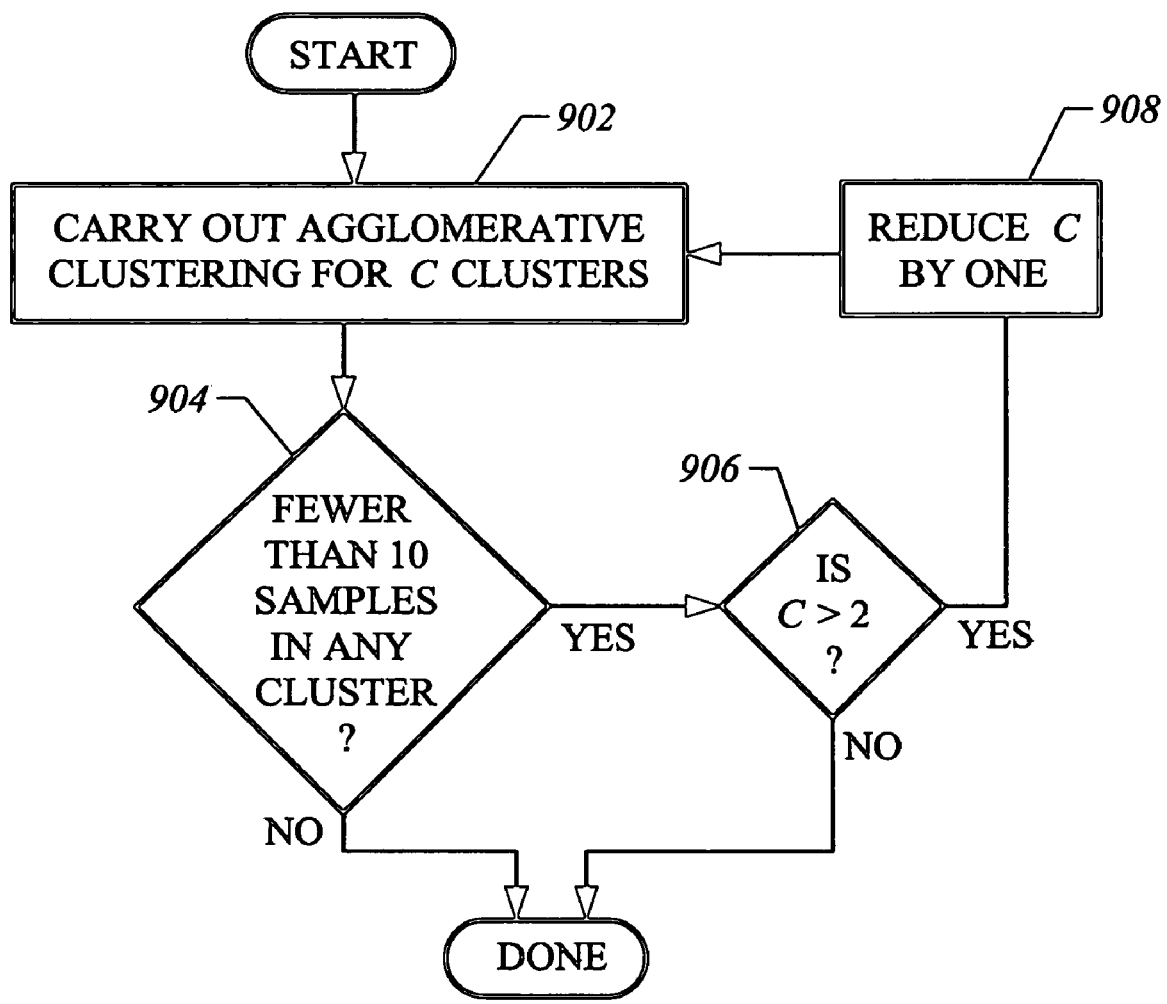
FIG. 9 shows a flowchart for dynamic class allocation.

FIG. 9 shows a flowchart for a dynamic class allocation algorithm. The algorithm may automatically select the number of classes based on, for example, criteria that a class must have at least a minimum number of samples. This approach begins with a pre-defined number of classes and applies an agglomerative clustering technique to the data 902. The number of samples is measured for each class. If the number of samples for any event class is less than the prescribed minimum number 904 (in an example this may be set to 10, or to at least 5% of the samples, or some other criterion may be used), and enough clusters remain 906, then the number of classes is reduced by one 908 and the agglomerative clustering is applied again 902 to identify the samples—i.e., the new class boundaries—for the new number of classes.

Agglomerative clustering and class allocation—whether dynamic or not—may be applied to any feature extracted from the input data series, not only to frequency, downtime, or MTTR. As previously discussed, MTBF and MCBF are other features that may be used and may typically be extracted from the data.

For some data, a percentile value may be a more appropriate feature than a mean value. For example, empirical data may indicate that while the mean time to address a particular machine event is 4 minutes, 95% of the time, the machine event is addressed within 3 minutes, and 80% of the time within 2 minutes. Selecting a percentile value of, e.g., 80%, thus may define a feature extraction of the input data series. This approach to feature extraction draws a feature value from the empirical cumulative distribution function (cdf) associated with a machine event logged in the input data series, and may be considered a confidence value extracted from the cdf. Confidence values as just described may also be used, along with MTTR, frequency, downtime, MTBF, and MCBF as mentioned above.

Further, agglomerative clustering and dynamic class allocation may be implemented to provide classes which overlap, e.g., 0-15 min., 10-60 min., 40 min or greater. These classes may be appropriate for some features extracted from the input data series. For example, if a histogram of the data resembles a mixture of 3 Gaussians or other probability density functions, the data may be better characterized with overlapping classes. Furthermore, class confidences or even parametrized class membership functions, for example Gaussians or sigmoid functions, may be appropriate for some data.

Figure 10:
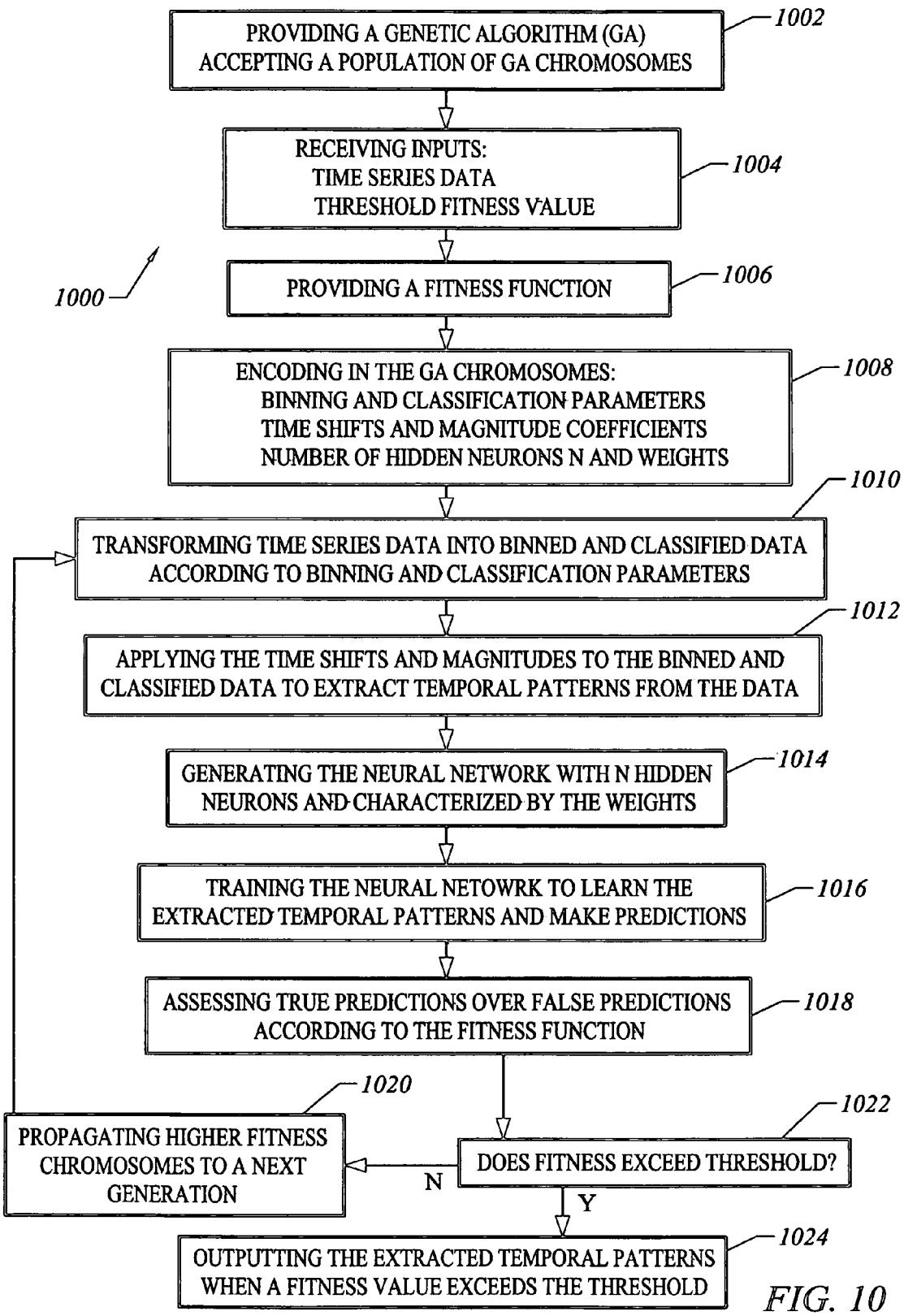
FIG. 10 is a flow chart of an embodiment of the method disclosed herein.

FIG. 10 shows a method using a specific search algorithm approach, in this case a genetic algorithm approach, to process the data available in an initial training period and a subsequent evaluation or test period to train a machine learning model, in this case a neural network, for temporal data mining in a deployment period following the evaluation period. The system, method, and apparatus disclosed herein may be described as the following four steps, driven by a genetic algorithm optimization routine. As previously mentioned in connection with FIG. 1, another integrated search algorithm may be utilized, such as, for example, integer programming, an uninformed search such as a list search, tree search, and graph search, an informed search, an adversarial search, a string search algorithm, and a simulated annealing algorithm.

In the first step the time series data is both binned and classified in a time sampling step. In the next step the data is processed in a time embedding step. Next, using the time embedding, the data undergoes a temporal pattern extraction step to prepare data for training and evaluation of a neural network. In the fourth step the neural network learns the extracted temporal patterns.

The genetic algorithm optimization routine uses a population of genetic algorithm chromosomes. This population may also be termed a generation, and the two terms, generation and population, may be used interchangeably in this disclosure. A chromosome in the population is a bit sequence, encoding values of parameters as described in detail below.

Referring now to FIG. 10, an embodiment of a method for temporal data mining is provided at 1000. The method is driven by a genetic algorithm adapted to accept a population or generation of genetic algorithm (GA) chromosomes. The genetic algorithm is provided as part of the method 1000 at 1002.

Another element of the method is the receiving of inputs at 1004. These inputs include time series data to which the temporal data mining method is to be applied, and a threshold fitness value used later in the method to branch to a step of outputting mined data.

At a step 1006 a fitness function is provided. The fitness function will be described further below in connection with the neural network evaluation.

As shown in a step 1008, a chromosome of a generation of GA chromosomes encodes parameter values for use in processing the time series data. Bits in a genetic algorithm (GA) chromosome encode the bin width used in the time sampling step. Additional bits may encode boundary values for the classes used in classifying elements of the time series data. Further additional bits in the chromosome encode a number of time shifts and corresponding magnitude coefficients used in forming a multidimensional combination of the time series data for the time embedding step. Still other bits encode a number to be used as the number of hidden neurons in a neural network, with additional bits encoding the weights for the neural network connections.

As described above, the time series data is both binned and classified in a time sampling step. This time sampling step is shown at 1010. The time series data may be irregularly distributed in time. Step 1010 can be viewed as a data transformation step that transforms the time series data from its original form into a uniformly sampled form. This transformation obviates the need for estimation of time of occurrence of the data during prediction.

As stated above, bits in a genetic algorithm (GA) chromosome encode the bin width in the time sampling step. The data is transformed into evenly spaced data by binning data, for example by performing a feature extraction from event downtimes, as previously discussed. The bins in the time sampling step may be of equal width so that the bin boundaries are evenly spaced in time. The data may be also classified into a small number of classes as discussed previously. The class boundaries—e.g., 2 minutes, 15 minutes, and 45 minutes—may be encoded in bits of a GA chromosome along with the bin width parameter. Alternatively, class boundaries found using agglomerative clustering may be employed. In another embodiment, as discussed above, overlapping classes, class confidences, or class membership functions may be used. Also, as noted above, overlapping classes and/or classification using class membership functions, may be employed.

The binned data is processed by a time embedding process and temporal patterns extracted at 1012. As will be explained in detail below, the time embedding process uses the time shifts and corresponding magnitude coefficients to form a multidimensional combination making up the time embedding process. The time embedding step is discussed further below in connection with FIG. 13.

The data undergoes temporal pattern extraction to prepare data for a neural network. Previous events are used to correlate the time series data with events of interest. This is done by making the assumption that particular predecessor events signal the desired event and so the temporal pattern is set up to predict the next sample of the time series. In another embodiment the pattern extraction may comprise Fourier decomposition. In still another embodiment the pattern extraction may comprise Time-Frequency Analysis. In still another embodiment, pattern extraction may comprise wavelet analysis.

These approaches to pattern extraction may be based for example on a sub-band decomposition or other technique that employs eigenfunctions or other orthogonal base representation to decompose or project the high dimensional space of the temporal data series (or a subseries thereof) into a smaller set of representative vector generating functions. Another typical example of this is the classical method of Principal Component Analysis and its derivative methods. Applying these approaches to the time series data may highlight relevant features as having high entropy, and which may then be used as pattern differentiators.

A neural network is generated at 1014. The parameters characterizing the neural network include the number of hidden layers; the number of neurons in each hidden layer; and the weights associated with the links of the neural network. These parameters are encoded in a GA chromosome. The temporal pattern is input and the class, that is, whether non-event, small, medium, or large, is output.

The neural network includes an input layer of neurons, which may be equal in number to one more than the number of dimensions used in the time embedding step in one embodiment. In another embodiment, for example, where class confidences may be used, the number of input neurons may be one more than the product of the number of classes and the number of dimensions used in the time embedding step. In an embodiment in which parametrized class membership functions may be used, for example with n parameters and a single argument, the number of input neurons may be one more than the product of n+1 and the number of dimensions used in the time embedding step.

The neural network also includes an output layer of neurons, equal in number to the number of classes used in the time sampling step in one embodiment. In an embodiment in which parametrized class membership functions may be used, the number of output neurons may correspond to parametrized membership functions for each class.

The neural network further includes a number of hidden layers of neurons, each hidden layer having some number of neurons. Between a neuron of one layer and a neuron of an adjacent layer is a link with an associated weight.

At 1016, the neural network is trained during the training period to learn the extracted temporal patterns and make predictions. Then the neural, network is supplied with temporal patterns extracted from time series data in the evaluation period. The genetic algorithm optimization routine compares the quality of the neural network predictions with the observed data taken during the evaluation period to assess the fitness 1018. Chromosomes that give better comparison results survive to the next generation in the genetic algorithm to provide new chromosomes by mutation and crossover 1020. Alternatively, if the assessed fitness exceeds 1022 the threshold fitness value (provided as input at 1004), a step 1024 is executed. In step 1024, the extracted temporal patterns along with the parameter values which resulted in the assessed fitness exceeding the threshold, are output. In this way a prediction may be realized that meets the input fitness criterion.

The detailed discussion relating to the steps of FIG. 10 that follows is primarily directed to a first embodiment. Differences between the first embodiment and other embodiments will be discussed below following presentation of the first embodiment.

Figure 11:
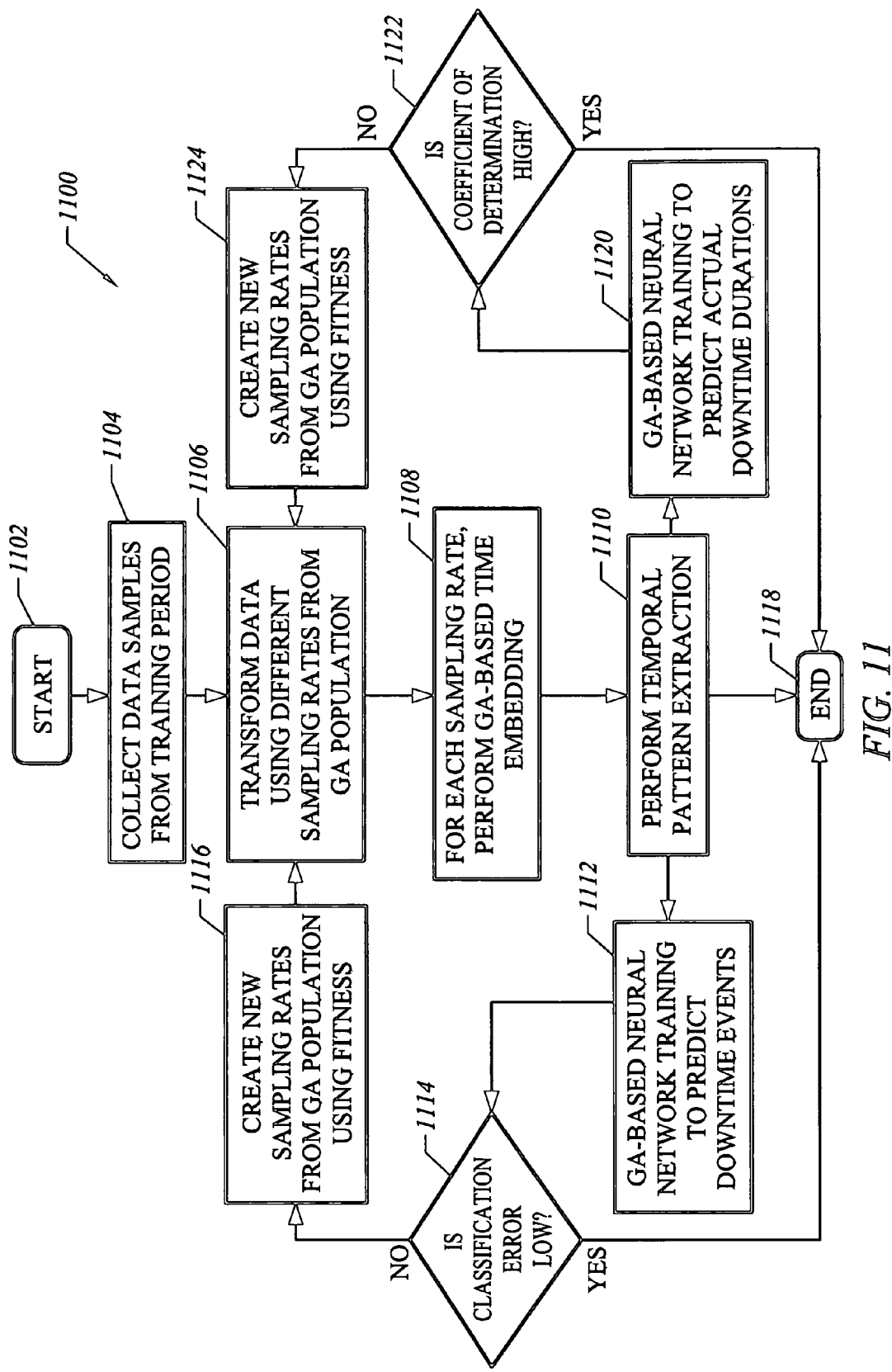
FIG. 11 shows an architecture of the hierarchical structure of an embodiment.

An architecture 1100 of the method of FIG. 10 is shown in FIG. 11. It can be seen that the method is typically hierarchical in structure. After a start at 1102, the method proceeds to a step 1104 of collecting data samples from the training period. Next, at 1106, the data is transformed using sampling rates from a population of GA chromosomes.

Note that the outer layer of the hierarchy may perform the sampling interval estimation and the inner layer may perform the remaining three steps sequentially. The processing of time series data occurs between the inner and outer layers in an iterative fashion until the convergence criterion of maximizing the prediction accuracy at a minimal false alarm setting is obtained.

At a step 1108 time embedding is performed, using parameters encoded in GA chromosomes. At 1110 temporal pattern extraction is performed.

At this point the method can proceed in two different ways, depending on the type of time series data, whether frequencies (or counts) of different types of events, or whether values of features associated with events, such as duration, cost, and the like.

Thus, there may be two different types of processing loops depending on whether the prediction task is event or sample value prediction. One of the loops may perform temporal event prediction while the other loop may perform temporal sample prediction within the evaluation period and the deployment period. Thus the methods disclosed herein operate in at least two modes. Two architectures discussed herein provide a hierarchical search process while a third architecture discussed below provides a direct search process.

In the first case, where the time series data involves counts of events and the prediction task is event prediction, a step 1112 is performed in which a neural network is trained to predict downtime events. At a subsequent step 1114 the classification error is determined (see equation (6) below). If the classification error is not low enough, new chromosomes are generated from the more successful chromosomes, i.e., those with higher fitness, to provide new sampling rates, time embedding parameters and neural network parameters, at 1116, to be used anew beginning with step 1106. If the classification error is low enough at step 1114, the method finishes at a step 1118.

In the second case, where time series data involve values of features associated with events and the prediction task is sample value prediction, a step 1120 is performed following the step 1110. In step 1120, a neural network is trained to predict actual downtime durations. At a subsequent step 1122 the coefficient of determination γ is calculated (equation (7) below). γ is a function of the mean squared error normalized by the variance of the actual data, as explained in more detail below.

If the coefficient of determination is not high enough, new chromosomes are generated from the more successful chromosomes, i.e., those with higher fitness, to provide new sampling rates, time embedding parameters and neural network parameters, at 1124, to be used anew beginning with step 1106. If the coefficient of determination is high enough at step 1122, the method finishes at a step 1118.

Turning now to discussion of the first embodiment in more detail, the step at 1106 provides for the estimation of a suitable sampling interval (i.e., bin width) for the data. This step also provides for transforming the data from its original form into a uniformly sampled form. The transformation process obviates the need for estimation of time of occurrence of the data during prediction. Data with unevenly distributed samples may be used in this step.

In this embodiment, estimating the sampling rate is a search process. Disclosed herein, a GA based search optimization method is provided for the search for a suitable sampling interval. The main advantages of the GA algorithm are that the parameters for the search are coded in bits of a chromosome and the search is itself guided by a fitness criterion. Also, the search process is parallel in nature because it simultaneously explores various parts of the parameter landscape by encoding the information in populations of chromosomes. The GA search process helps in rapidly converging to a solution that may be close to optimal. In this embodiment, three of the four components (except temporal pattern extraction) employ GA for search optimization. As shown in FIG. 11, the search for a suitable sampling rate forms the outer layer of the hierarchy. The search is guided by the criterion of maximizing prediction accuracy while minimizing false alarms.

Figure 12:
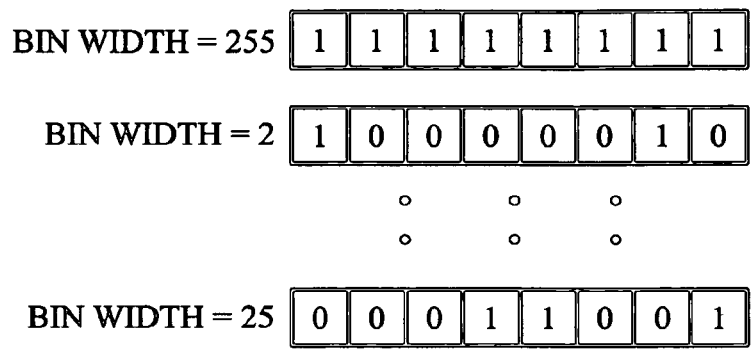
FIG. 12 shows an example GA population of bin widths with $N_s=8$.

FIG. 12 shows an example of a GA population of bin widths with $N_s=8$. To set up the GA search for sampling interval estimation, the sampling interval parameter is encoded in the form of a chromosome as shown in FIG. 12. The number of bits $N_s$ to encode the sampling interval may be derived as a function of the average sampling interval A between consecutive samples within the training period as:

$$N_S = \frac{\log(A)}{\log(2)} + 2 \qquad (1)$$

In another embodiment, other statistics of the time series data, instead of or in addition to the average sampling interval A may be used to derive the number of bits $N_s$ to encode the sampling interval.

A population of these chromosomes is created for the GA based search. To evaluate the fitness of these chromosomes, the GA uses a function based on the combination of prediction accuracy and false alarm on data within the training period and the evaluation period (as will be described in detail below). The population of these chromosomes is allowed to reproduce and mutate into the next generation after the remaining three components of the inner layer shown in FIG. 11 are allowed to process the data. This is because the fitness of the sampling interval chromosomes cannot be evaluated until all the steps of the method are completed. The members of the population within a generation provide a sample interval. Using this sample interval, the data is then transformed into time sampled data as previously described.

If no data is found to exist in a given sampling interval in the transformed space, then it is assumed to be a non-event or not important and random noise close to zero is used to interpolate the data. On the other hand, if there are several samples found in the sampling interval, there are three basic approaches to interpolation: store the peak value or store the average, median or mode of all the time samples in the interval or store the sum of all the samples (integration) found in the interval. The choice of interpolation can either be manually selected or automatically decided. To decide automatically on the choice of interpolation, an approach may be to evaluate the fitness of all the three types of transformed data samples through the inner layer.

Next, the data, transformed by binning and classification, undergoes a time embedding step. The transformed data is converted into a temporal pattern with time embedding of samples from the past. The embedding step uses the current sample and a set of appropriately chosen past samples to create a temporal pattern or the phase space representation of the time series. Even for non-stationary and chaotic deterministic signals, an appropriate phase space representation will form an attractor for the time series data. In the phase space representation the data has a more predictable form than its original chaotic form. Thus, an appropriate phase space representation may extract deterministic features in the time series. In this embodiment, the phase space representation is extracted using a genetic algorithm formulation.

Figure 13:
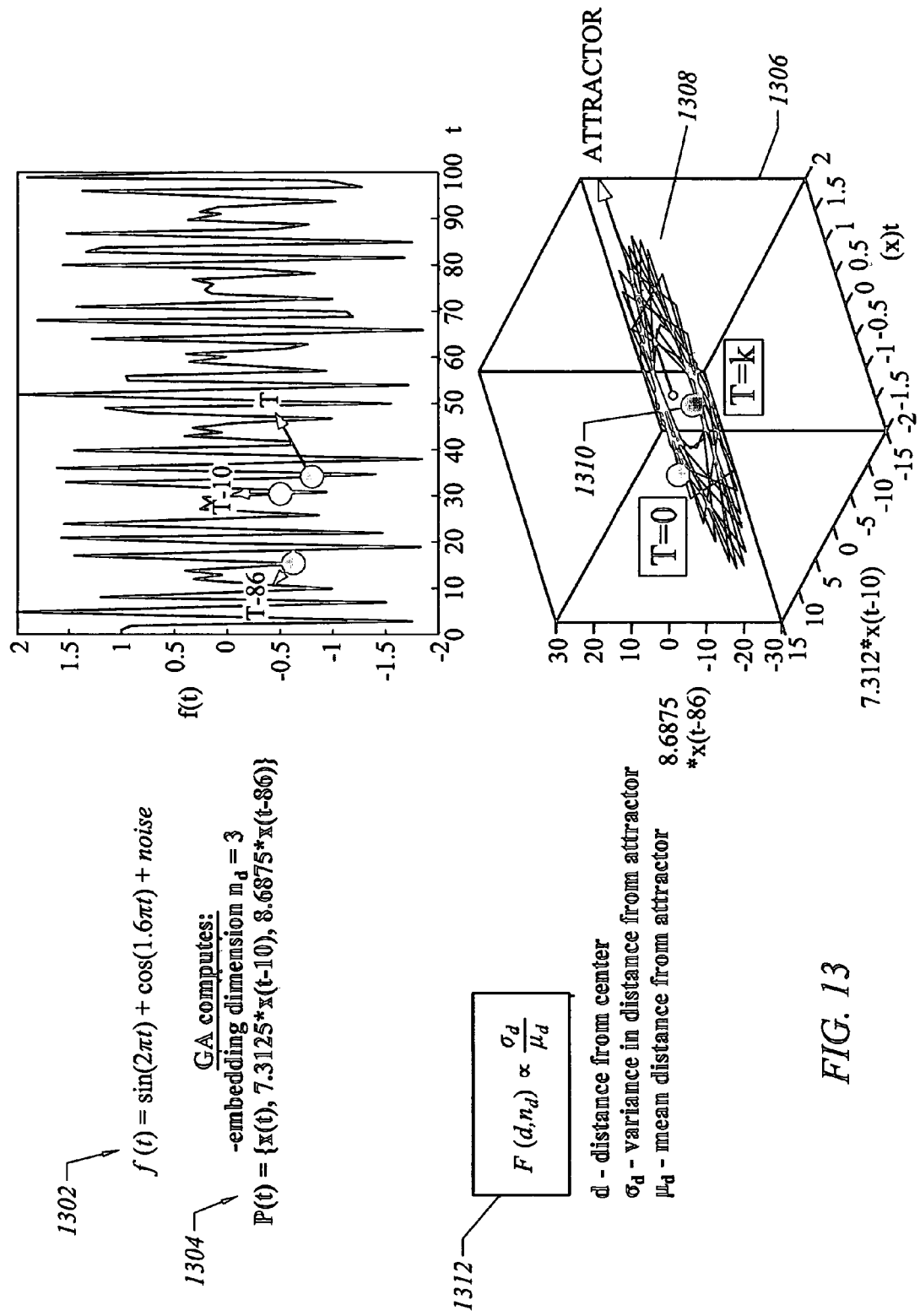
FIG. 13 shows an example of extraction of phase space representation using the GA process described herein.

FIG. 13 shows an example for extracting the phase space representation using a genetic algorithm formulation. In this example, the input signal is a periodic function 1302. Using a GA search, the phase space representation P(t) extracted is 3-dimensional as shown in FIG. 13. That is, P(t) has 3 components. The first component is the binned and classified time series, and each of the remaining two components is a copy of the binned and classified time series, scaled and delayed, as shown 1304 in the figure. When the phase space representation is plotted 1306, it can be seen that the trajectory traces a ring 1308 in three dimensions. The centroid of the ring forms the attractor 1310 for P(t). The future location of the trajectory is predictable from the present and past observations of the phase space representation.

Figure 14:
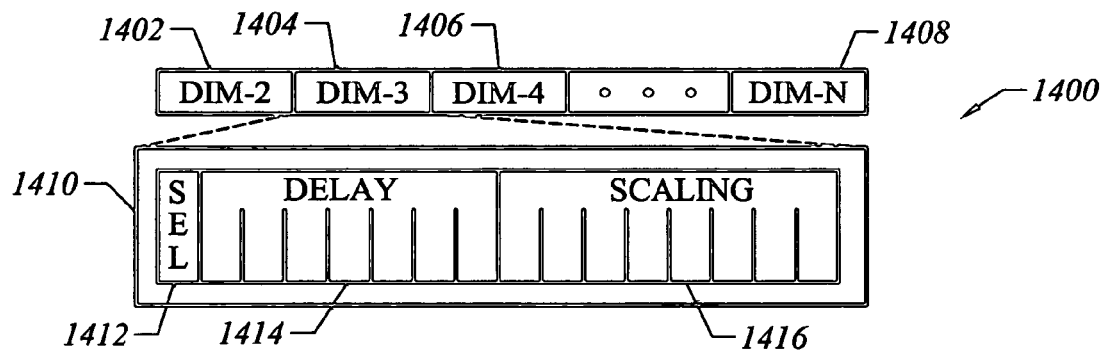
FIG. 14 shows a GA chromosome that encodes the parameters for time embedding.

FIG. 14 shows a single chromosome 1400 that may be used for a time embedding in N dimensional phase space. There are three parameters that are encoded in this chromosome: the number of past samples N−1, the delays and scales for these samples. The number of past samples is encoded by using an N−1 16-bit chromosome, that is, the size of the chromosome encodes the number of past samples. In FIG. 14, the 16-bit chromosomes are labeled DIM-2 1402, DIM-3 1404, DIM-4 1406, through DIM-N 1408. 16-bit chromosome 1404 is displayed in detail 1410 to show one possible layout of the information encoded in the 16-bit chromosome.

A single bit 1412 within each 16-bit chromosome called the SEL bit is used to select or not select that particular past sample. The select bit is included in the search space of the optimization algorithm and it can be selected or not during the optimization procedure depending on the data/function to be optimized. The remaining 15 bits are partitioned into two parts: a 7 bit-delay portion 1414 and an 8-bit scale portion 1416. The delay information is encoded as a 7-bit number to amount to a maximum delay of 127 past samples. The scale parameter for each selected past dimension is encoded with eight bits with four for the integer part and the remaining four for floating point part. Thus, the scale ranges between [$\frac{1}{16}$, $15\frac{15}{16}$].

The search then proceeds to arrive at an optimal set of time embedding parameters using fitness function 1312 as listed in FIG. 13. This function is the ratio of variance in the distance from the attractor to the phase space trajectory to the mean distance of the trajectory from the attractor. The set of time embedding parameters found at the end of the search is optimal in the sense of providing a minimum, or near minimum, value for the fitness function 1312.

The GA acts to minimize this ratio, or maximize the inverse of it, by propagating to a next generation of chromosomes those which result in smaller values for the ratio (or larger values for its inverse). For the example shown in FIG. 13, the GA estimates a 3-dimensional phase space representation with the scale parameters estimated as {1, 7.3125, 8.6875} and the delays as {10, 86}. The number of bits used to encode any of the parameters into a GA chromosome can be increased or decreased in order to achieve either a practical need or an accuracy constraint, extending in this way the flexibility of the optimization. That is, the GA need not be restricted to use of 16-bit chromosomes, and chromosomes with more or fewer bits may be used.

After estimating the phase space representation, extracting temporal patterns within the training window takes place 1110 (see FIG. 11). Using the phase space representation to appropriately select past samples and weight their relevance using the scale parameters at each time step, temporal patterns are extracted. For temporal patterns whose events are to be classified, the temporal pattern is labeled as belonging to an event class based on the nature of the time series for the next sampling interval in the binned and classified data of the transformed data space. If appropriate, class confidences or a membership function may be used. For temporal patterns extracted from time series data where the values of features associated with events of the time series are relevant, the temporal pattern is set up to predict the next sample of the time series. [This setup process involves a feedback of the network prediction of the class for the previous time step in the form of a value. In this embodiment, the class mean value may be used as feedback. In other embodiments the median, fuzzy centroid or other methods could be used as well or instead.]

Figure 15:
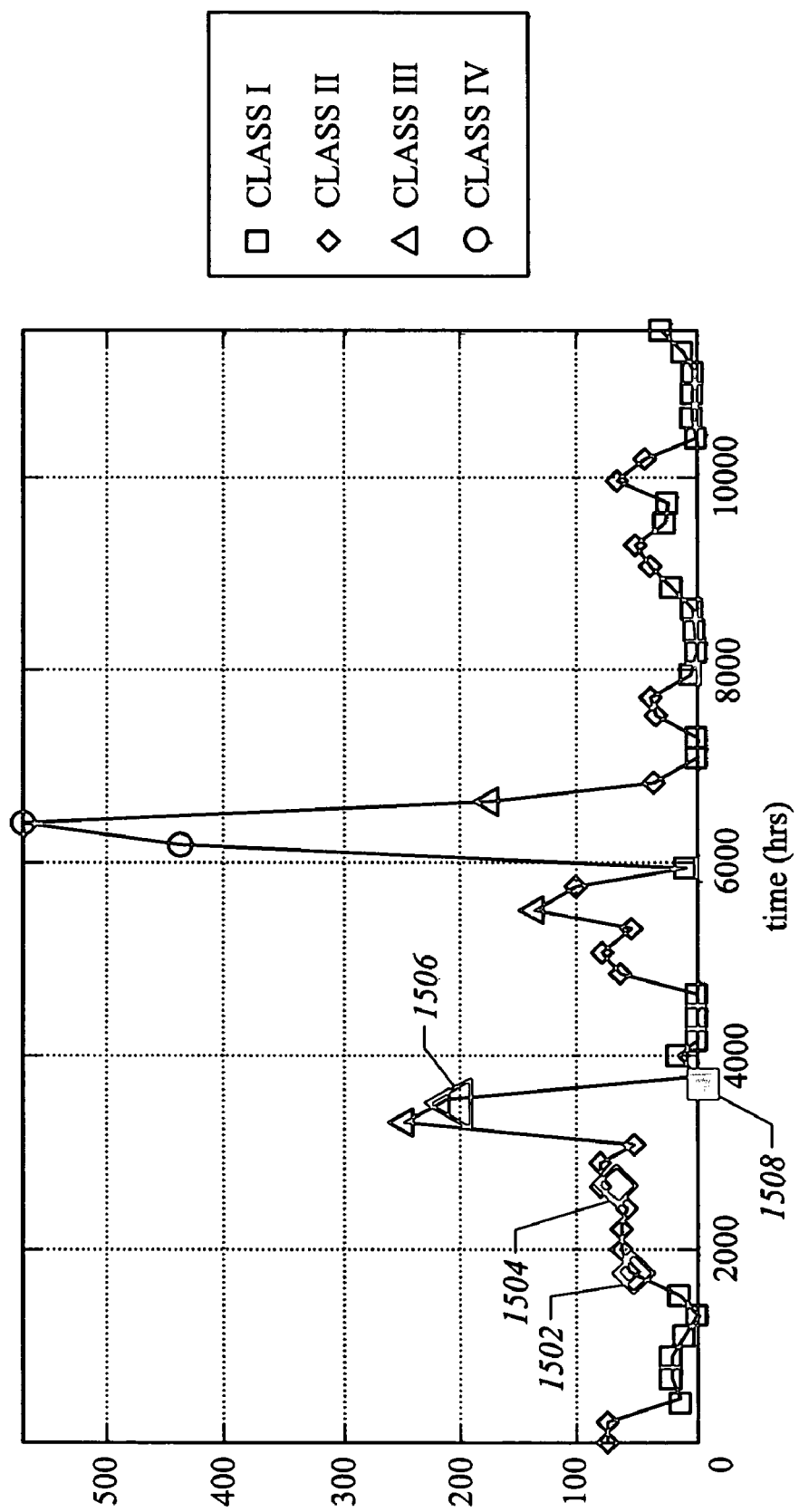
FIG. 15 shows an example of temporal pattern extraction for four event classes.

FIG. 15 shows an example of extraction of phase space representation using the GA process described herein. Four classes are used for a temporal event classification task as shown. The temporal pattern is 3-dimensional and has four different types of event classes (shown by four different markers). An instance of the 3-D temporal pattern is shown in the figure by the three markers 1502, 1504, and 1506. Another marker 1508 represents the event class to be predicted. It should be noted that temporal pattern extraction is the only step among the four that does not perform any searching of parameters.

Next, either the classification (Class I, II, III, and IV) of the extracted temporal patterns is identified as an event predictor/non-event predictor, at 1112, or the temporal pattern is used to predict the next sample 1120. To achieve this, a training set of these patterns with appropriate class labels or future samples from past history is constructed. The GA based neural network process as described herein is used to learn to separate the classes of temporal patterns and/or predict the next sample in the training set.

The GA-based process described herein operates substantially automatically, and does not necessarily require the user to adjust the system parameters such as the number of hidden layer nodes, the learning rate (the rate at which the network learns to match the temporal patterns to the class labels), and the momentum rate (the momentum rate helps push the neural network out of local minima in which it may occasionally become stuck). The learning and momentum rates may be fixed at 0.1 and 0.9 respectively.

In other embodiments, adaptive values for these parameters such as may be based on the rate of minimizing the prediction error, may be used. Here if the prediction error is high then the learning rate may be decreased and the momentum rate may be zeroed until the error starts to fall. On the other hand, if the prediction error falls rapidly at a time step, then the learning rate and momentum rate may be increased to further accelerate the process.

Furthermore, the GA based process described herein employs a parallel search to minimize the error function as opposed to a conventional neural network where the gradient search is conducted in the neighborhood of its initial state. If the initial state is far away from the global minima, the neural network could take a long time to converge, using a gradient search. In a GA-based neural network initialization, a population of chromosomes enables a search process which can begin at a number of different points, and take place in parallel.

Figure 16:
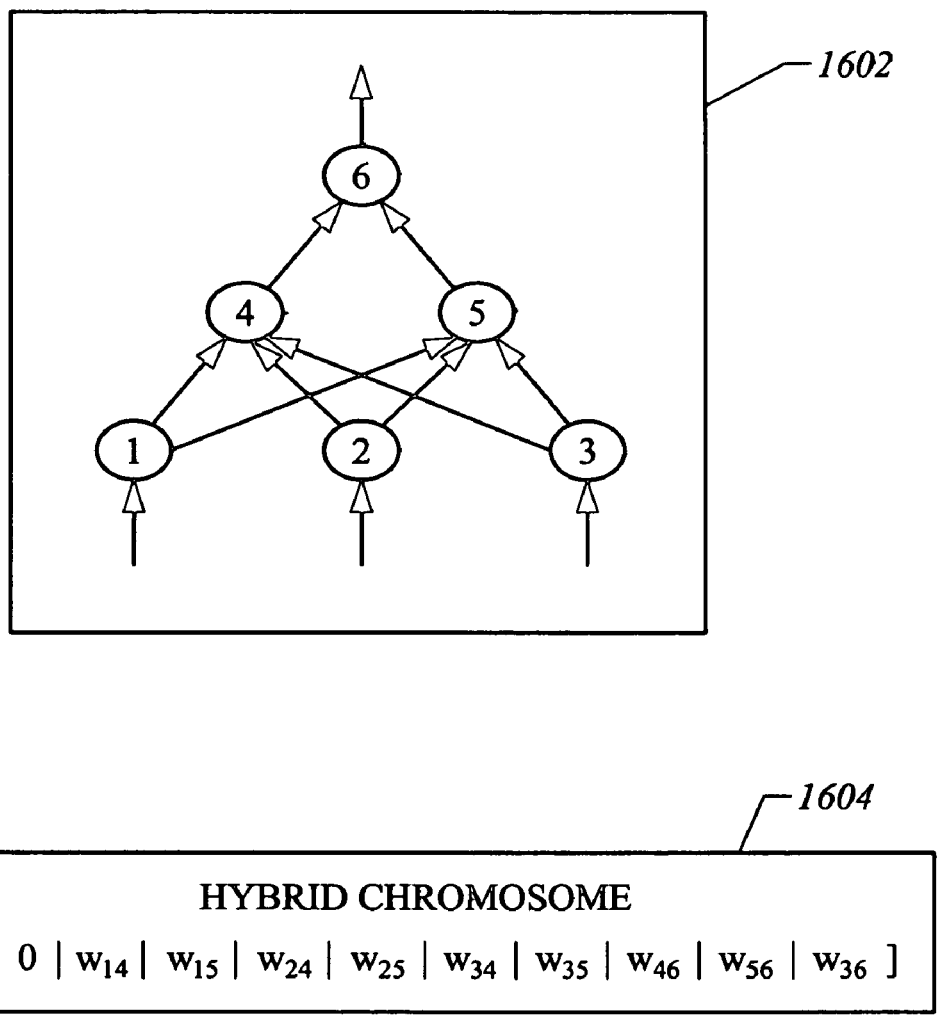
FIG. 16 shows a hybrid chromosome for the GA based neural network search algorithm.

The embodiment as illustrated in FIG. 11 may use a hybrid chromosome to encode each neural network in the population as shown in FIG. 16. An example neural network 1602 with three input nodes, two hidden nodes, and one output node is shown, along with a hybrid chromosome 1604. (In an application as appropriate to an embodiment as described herein, a neural network may have output nodes equal in number to the number of classes (e.g., no event, small, medium, and large) used in the classification of events. In another embodiment in which output may include parametrized class membership functions, there may be a correspondingly greater number of output nodes.) It will be appreciated that in general there may be more than one layer of hidden nodes.

The first three bits of hybrid chromosome 1604 may determine the number of hidden layer nodes. Here, the bits 0, 1, 0 determine that there are two hidden nodes, as shown. Once the number of hidden layer nodes is determined, the length of the hybrid chromosome is automatically determined because the number of inputs and outputs are fixed. Each member of the GA population of hybrid chromosomes corresponds to a neural network. To compute the fitness of each network, the mean square error (MSE) of the network for all the patterns in the training set is computed. The fitness of a neural network solution is computed as the inverse of MSE.

The mean square error is defined as $$MSE = \frac{1}{N - \Delta - 1} \sum_{t=\Delta+1}^{N} \sum_{c=1}^{C} (d_{tc} - a_{tc})^2 \qquad (2)$$

In the calculation of MSE, N is the number of data samples in the training set. As discussed above, the time embedding step uses a set of time shifts and corresponding magnitude coefficients. If the entire training period contains N data samples, and $\Delta$ is the largest time shift in the set of time shifts, then there are $N-\Delta-1$ data samples in the training period. C is the number of classes used in the classification; in the embodiment described herein, C=4, but other values of C may be used. $d_{tc}$ is the desired numeric value of the class c at time t, and $a_{tc}$ is the actual/estimated value of the class c at time t.

Some neurons may be idealized as producing a bipolar output, e.g., $-1$ or $+1$. In the implementation of a neural network, a neuron may model a bipolar output by producing an output lying in a range between $-1.0$ and $1.0$. In a neural network adapted to produce class output, as shown at 1702 in FIG. 17, each output neuron is associated with one of the classes. With each class output a class confidence may be associated, as discussed previously in connection with FIG. 8. The class confidence is a figure of merit for the neural network prediction for that class. It may be defined as $$Conf(\text{class}) = \frac{\text{Output(class)} - \text{low}}{\text{high} - \text{low}} \qquad (3)$$

where low and high are nominal values of, e.g., $-0.9$ and $0.9$ may be used.

Figure 17:
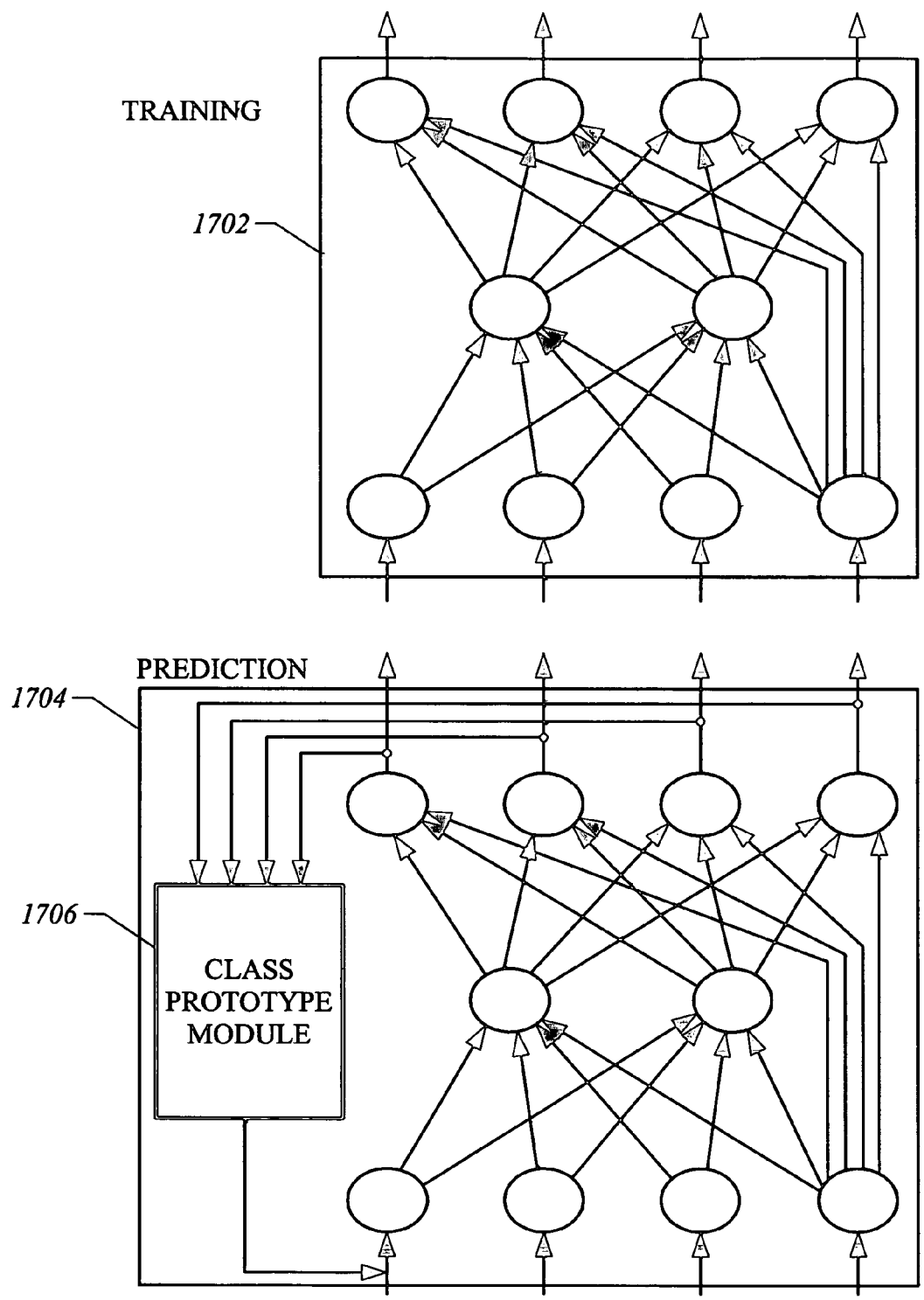
FIG. 17 shows an example GA-based neural network predictor during the training and prediction phase for the temporal class prediction task.

FIG. 17 shows how a confidence measure may be used in order to make predictions beyond the next sampling interval by weighting predictions made in the previous time steps. FIG. 17 shows an example GA-based neural network predictor during the training phase at 1702 and during the prediction phase at 1704 for the temporal class prediction task. A class prototype module 1706 may be used when the neural network produces multiple class output with associated confidences, for example, (0.0, 0.0, 0.4, 0.6).

One way to accomplish a look-ahead in order to make predictions beyond the next sampling interval may be to assume the class associated with the 0.6 (i.e., the class associated with the largest probability) is to be supplied as input. Another way may be to take the 0.4 and 0.6 and weight the prototypes based on these confidences. For normalization, dividing the result by the sum of the confidences may be done, so as to effectively convert the confidences to probabilities. When there is an n-fold class prediction by the neural net, the class prototype is generated as a function of those n confidences. If the previous time step was a confident prediction, then the class prototype value (or the predicted next sample value) is used as the prediction for the phase representation for the next step. In another embodiment, the class prototype module 1706 may accept parametrized membership functions as input, and produce a parametrized membership function as output.

The performance of the TDM approach may be tested using a plurality of scores $s_1, s_2, \ldots, s_n$ based on the four possible prediction outcomes: true positive (TP), false positive (FP), true negative (TN) and false negative (FN). True positive and true negative refer to the ability to correctly predict that an event or a non-event occurred. Similarly, false positive and false negative refer to the inability to correctly predict that an event or a non-event occurred.

In the embodiment described herein, true positive for a given class occurs when the system predicts that class and the desired outcome is also that class, for classes that are not non-events. For example, if the desired outcome is SMALL, and the system predicts SMALL, then the TP count is incremented by one. If on the other hand, the system predicts LARGE, MEDIUM or NONEVENT, then FN count is incremented by one. If the desired outcome is NONEVENT, and the system predicts NONEVENT, then the TN count is incremented by one. If on the other hand, the system predicts LARGE, MEDIUM OR SMALL, then FP count is incremented by one.

Using these values, two scores $s_1$ and $s_2$ are defined as:

$$s_1 = \frac{TP}{TP + FP} \qquad (4)$$

$$s_2 = \frac{TP + TN}{TP + TN + FP + FN} \qquad (5)$$

Additional scores $s_3, \ldots, s_n$ may be defined as other functions of TP, TN, FP, FN, and indeed of any features or similarity measures between features or any other algorithm variables.

As defined above, $s_1$ represents the ability to accurately determine events while $s_2$ represents the ability to accurately determine both events and non-events. Other linear or non-linear fitness functions can be defined based on a variety of success criteria depending on the problem at hand, and these may include TP, TN, FP, FN or other problem metrics. Using these scores for the training period and the evaluation period, the performance measure for evaluating the fitness F of the sampling rate chromosomes may be defined as $$F = G(s_1, s_2, \ldots, s_n, TP, TN, FP, FN, s_{1*}, s_{2*}, \ldots, s_{n*}, TP^*, TN^*, FP^*, FN^*, \ldots)$$

where the * values are the indices or measurements from the testing period and the unstarred values are the ones from the training period.

In a particular embodiment, for example, the fitness may be defined as $$F = (s_1 * s_2 + s_1^* * s_2^*) \qquad (6)$$

where, as just described, $s_1$ and $s_2$ may represent the two scores for the training period while $s_1^*$ and $s_2^*$ may represent the two scores for the evaluation period. This information is used to refine the GA population for sampling rates until F is maximized. In an application dealing with prediction of actual data samples (i.e., actual values of downtime durations) rather than class information, the coefficient of determination γ, which is a function of the mean squared error normalized by the variance of the actual data, may be used. The coefficient of determination is defined as:

$$\gamma = 1 - \frac{\sum_{i=1}^{n}(x_i - xp_i)^2}{\sum_{i=1}^{n}(x_i - \mu_d)^2} \quad (7)$$

where $xp_i$ is the predicted value, $x_i$ is the actual value and $\mu_d$ is the mean value of the $x_i$. For a perfect predictor, γ should be 1, whereas γ for a trivial mean predictor is zero. Although γ can also be negative, it usually doesn't make sense to evaluate a predictor whose γ is even close to zero. Maximizing F (or γ) ensures that the prediction accuracy is maximized while minimizing false alarms. In this manner, the four steps are tightly coupled such that the best possible prediction solution can be obtained.

The time embedding in this embodiment uses a fitness function (refer to FIG. 13) so that the embedding captures a stable attractor for the time-series data. In a second embodiment, the fitness function in equation (6) (or (7), when dealing with prediction of actual data samples rather than class information) is used. This choice of fitness function ensures that all components of the hierarchy are aligned with the goal of maximizing prediction accuracy while minimizing false alarms. A summary of the second embodiment is provided in FIG. 18.

Figure 18:
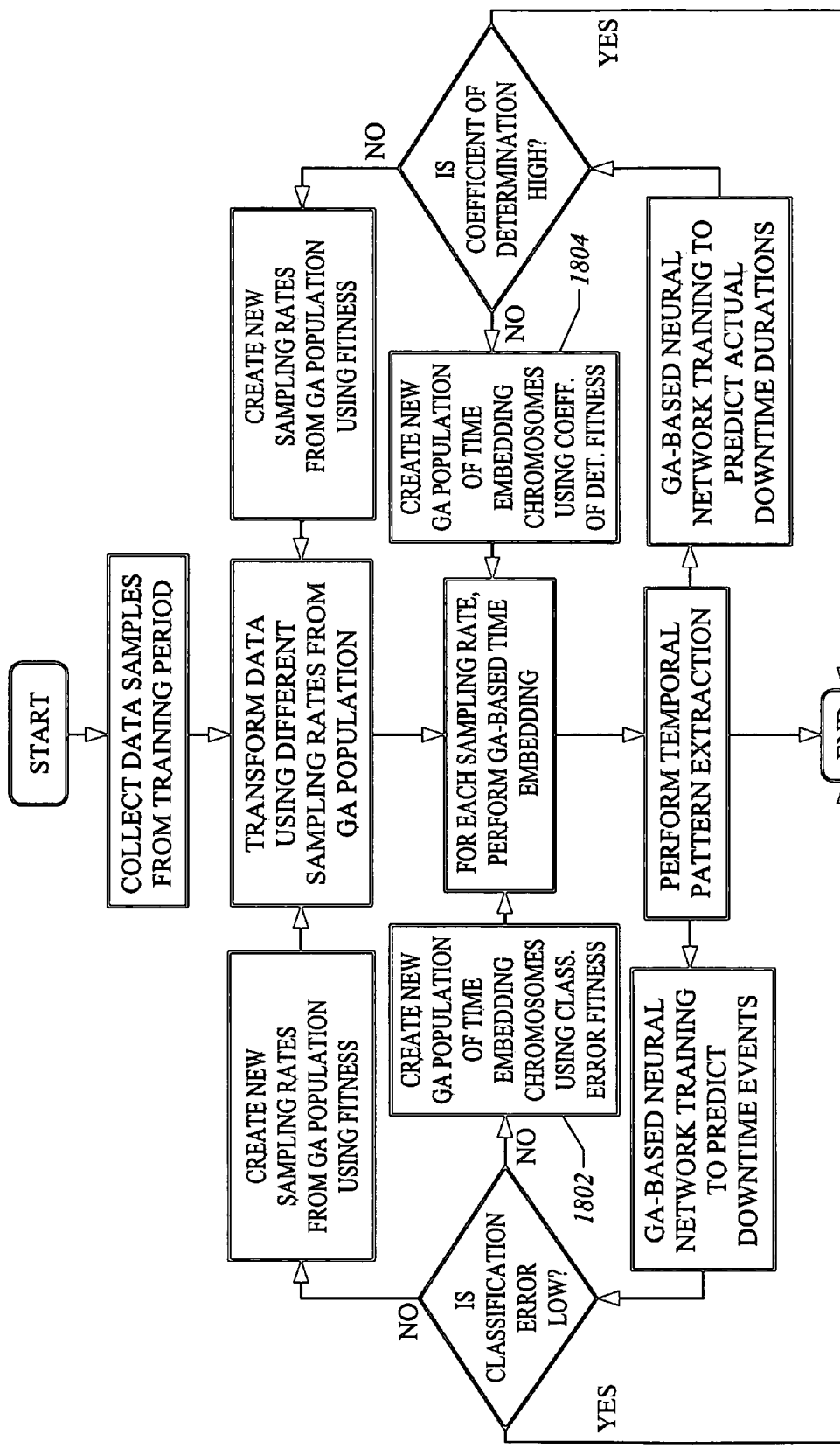
FIG. 18 is an architecture of a second embodiment of the method disclosed herein.

FIG. 18 differs from FIG. 11 primarily in the addition of steps 1802 and 1804 to create new populations of time embedding chromosomes using the classification error fitness (equation (6)) or the coefficient of determination (equation (7)) as appropriate.

The hierarchical nature of the second embodiment differs from the first embodiment in terms of processing data as well. In this embodiment, the time embedding GA population is updated after the GA-based neural network has finished processing the data using current embedding since the fitness is evaluated on the basis of equation (6) (or (7) as explained above).

Figure 19:
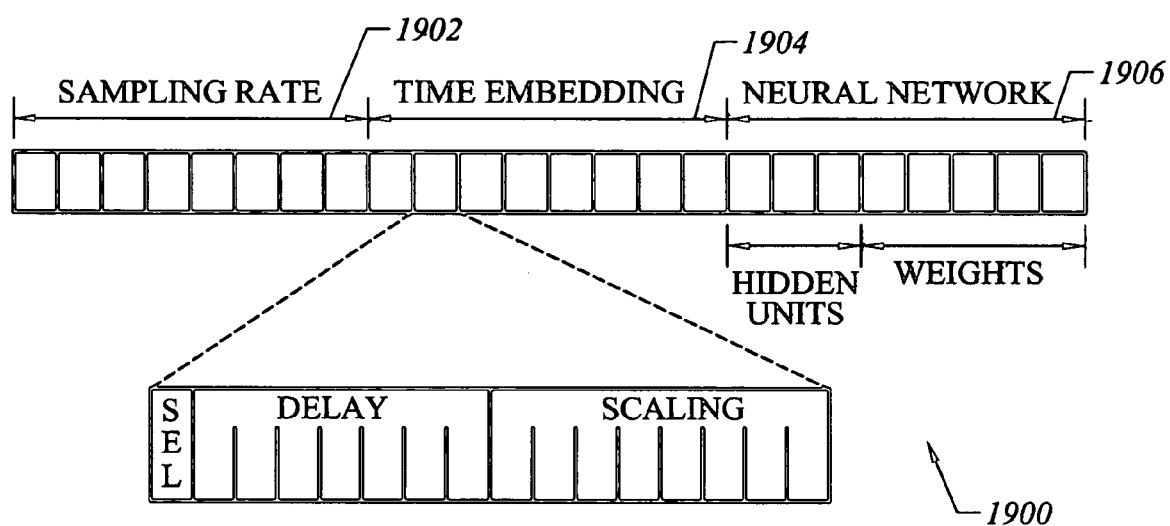
FIG. 19 shows a chromosome structure for a third embodiment.

A third embodiment differs from the two previous embodiments in that no hierarchy is present. Instead, the entire processing is performed at one level with a single chromosome designed to address all the four components of the TDM approach. FIG. 19 is an example chromosome for the search in the third embodiment. FIG. 19 is further an illustration for the chromosome structure 1900 of the third embodiment.

Each chromosome has three pieces of information. The first piece 1902 encodes the sampling rate component. The second piece 1904 encodes the time-embedding portion (same as in FIG. 14) while the last piece 1906 encodes the GA-based neural network portion (same as in FIG. 16). The chromosome of FIG. 19 can be considered as a hybrid chromosome because it contains both floating and binary elements/genes. The chromosomes are evaluated for their fitness using the function in equation (6) (or (7), as appropriate) in a manner similar to the second embodiment. During evolution of the population using this hybrid chromosome, three cross-over operations may be performed for each chromosome. The first crossover point is set up to be within the sampling rate portion of the chromosome. The sampling rate portion of the chromosome may be purely binary. The second crossover point may be within the time-embedding portion of the chromosome. The third crossover point may be within the neural network part of the chromosome. Mutation is allowed to flip any binary bit in the chromosome randomly. The third embodiment searches for many parameters in each generation. Much like the second embodiment above, only a single fitness criterion based on maximizing prediction accuracy while minimizing false alarms may be used.

The embodiments discussed above may further include partitioning one or more of the search subtasks to provide for use of a distributed GA approach. In this approach, the search subtask may be modularized using the following steps. First, the large search space for the particular subtask is partitioned into subspaces. In this way each subspace may represent a subcomponent of a potential solution of the search subtask. Distributed genetic algorithms develop subcomponents by developing subpopulations of chromosomes, the subpopulation evolving according to simple (i.e., non-distributed) GAs. Complete solutions may be obtained by assembling representative members of each subpopulation. Credit assignment at the subpopulation level may be defined in terms of fitness of the complete solutions in which the subpopulation members participate.

Figure 20:
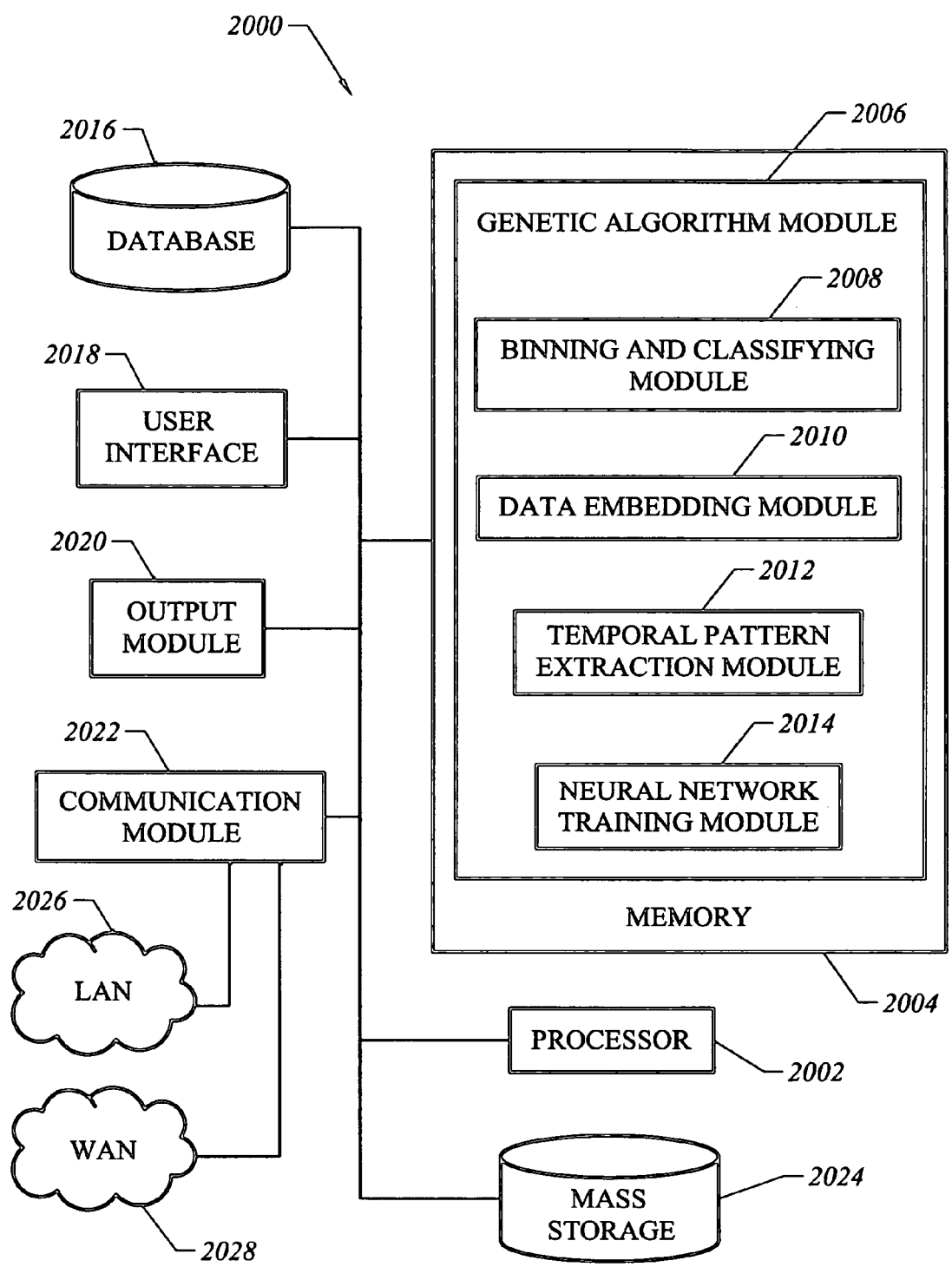
FIG. 20 is a system diagram for implementation of process (es) described herein.

A system for providing the GA process described herein is illustrated in FIG. 20 at 2000. The system 2000 includes a processor 2002 connected with memory 2004. Memory 2004 includes a genetic algorithm module 2006 which itself contains a binning and classification module 2008, a data embedding module 2010, a temporal pattern extraction module 2012, and a neural network training module 2014.

The processor is also connected to a database 2016, a user interface 2018, an output module 2020, a communication module 2022, and mass storage 2024. Time series data from database 2016 is processed by processor 2002 using the instructions of genetic algorithm module 2006. User input is provided using user interface 2018, and output may be provided to output module 2020. The user interface may comprise a computing device, such as a desktop computer, a handheld portable computing device, a laptop computer, a PDA, or other suitable computing device. Communication module 2022 may communicate with other devices or systems through LAN 2026 and/or WAN 2028. Additional input or output data may also be stored in mass storage 2024.

Figure 21:
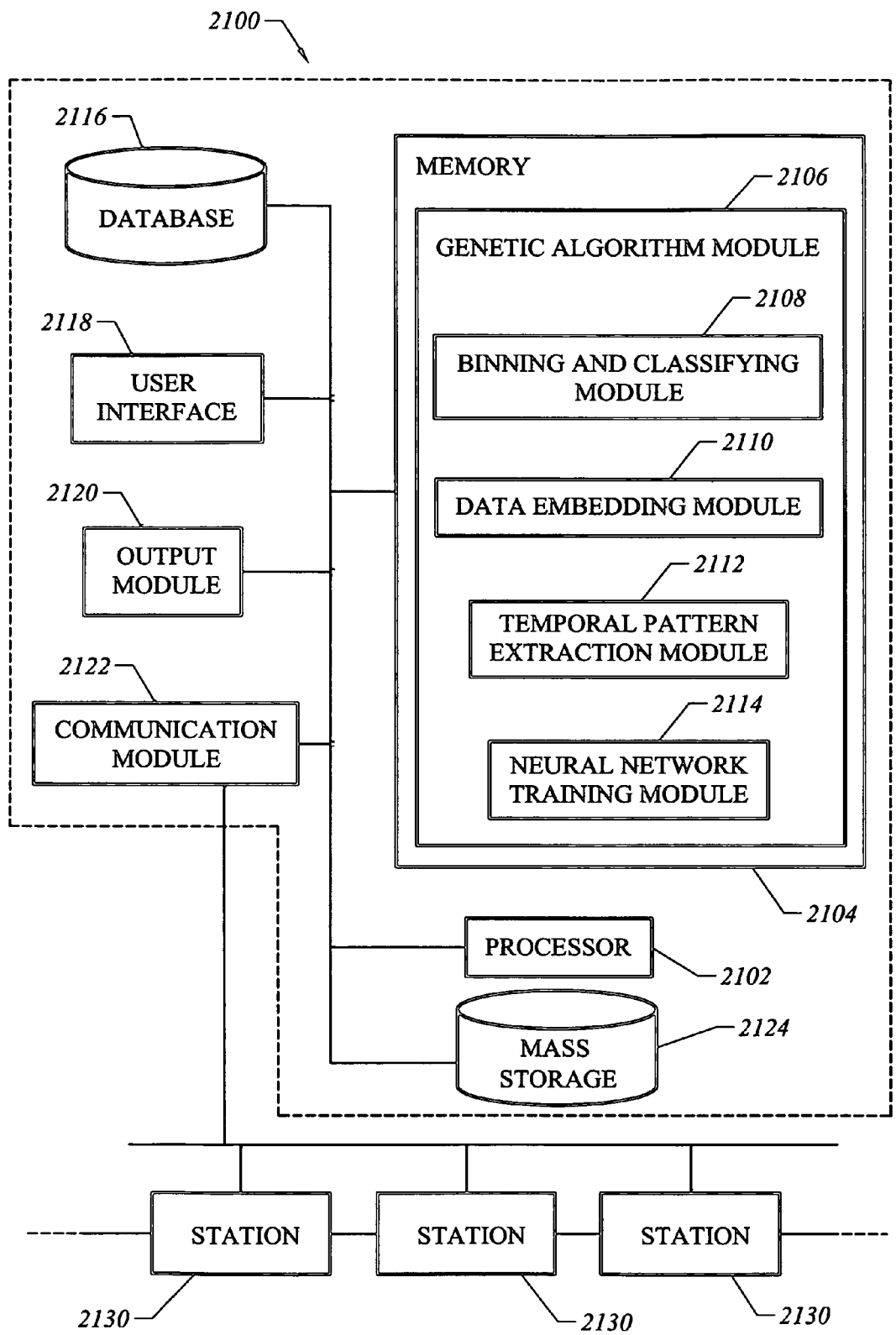
FIG. 21 is an apparatus for carrying out process(es) described herein.

An apparatus 2100 for carrying out process(es) of the above-described system is illustrated in FIG. 21. Apparatus 2100 includes a processor 2102 connected with memory 2104. Memory 2104 includes a genetic algorithm module 2106 containing a binning and classification module 2108, a data embedding module 2110, a temporal pattern extraction module 2112, and a neural network training module 2114. The processor is also connected to a database 2116, a user interface 2118, an output module 2120, a communication module 2122, and mass storage 2124. Communication module 2122 communicates with sensors on machine stations 2130. Data from machine stations 2130 may be stored in database 2116 as time series data. Processor 2102 processes time series data using the instructions of genetic algorithm module 2106. User input is provided using user interface 2118, and output may be provided to output module 2120. Additional input or output data may also be stored in mass storage 2124.

It will be appreciated that another embodiment may incorporate one or more additional steps beyond the four steps discussed above. Parameters characterizing the one or more additional steps may be encoded in additional chromosomes in such an embodiment. For example, any other parameters of the problem that are currently either hard-coded or user defined can be encoded into the GA chromosome and thus its optimal value will be found as a part of the global GA optimization procedure.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer implemented method of signal characterization for event code analysis in a manufacturing facility, comprising an integrated search algorithm that cooperatively optimizes data mining sub-tasks, the integrated search algorithm including a machine learning model, the integrated search algorithm comprising:
    processing the data for data embedding that includes extracting quantity or quality features from the data;
    data embedding the processed data for searching for patterns;
    extracting time and frequency patterns to provide training samples that include temporal and useful patterns of data that can be used for modeling, estimation, prediction and/or analysis of data features; and
    training the machine learning model to represent the temporal and useful data patterns for signal characterization according to the training samples, wherein the temporal and useful patterns of data include information that is used to optimize a system or process.

2. The method of claim 1, wherein the integrated search algorithm cooperatively optimizes data mining tasks concurrently.

3. The method of claim 1, wherein the integrated search algorithm cooperatively optimizes data mining tasks hierarchically.

4. The method as recited in claim 1 wherein processing the data for data embedding comprises utilizing an automated clustering algorithm.

5. The method of claim 1, wherein processing the data for data embedding comprises feature extraction.

6. The method of claim 1, wherein the integrated search algorithm comprises a genetic algorithm.

7. The method of claim 1, wherein extracting time and frequency patterns comprises temporal data mining.

8. The method of claim 1, wherein the machine learning model comprises a neural network.

9. A system for signal characterization for event code analysis in a manufacturing facility, comprising:
    a processor to execute instructions of a software module;
    an instruction module comprising an integrated search algorithm that cooperatively optimizes data mining sub-tasks, the integrated search algorithm including a machine learning model;
    a processing module for processing the data for data embedding that includes extracting quantity or quality features from the data that can be used for modeling, estimation, prediction and/or analysis of data features;
    an embedding module for data embedding the processed data for searching for time and frequency patterns;
    an extraction module for extracting time and frequency patterns to provide training samples that include temporal and useful patterns of data that can be used for modeling, estimation, prediction and/or analysis of data features; and
    a training module for training the machine learning model to represent the temporal and useful data patterns according to the training samples, wherein the temporal and useful data patterns include information that is used to optimize a system or process.

10. The system of claim 9, wherein the integrated search algorithm cooperatively optimizes data mining tasks simultaneously.

11. The system of claim 9, wherein the integrated search algorithm cooperatively optimizes data mining tasks hierarchically.

12. The system of claim 9, wherein the integrated search algorithm comprises an optimization routine.

13. The system of claim 9, wherein the integrated search algorithm comprises a genetic algorithm.

14. The system of claim 9, wherein data embedding the processed data comprises feature extraction.

15. The system as recited in claim 9 wherein data embedding the processed data comprises clustering.

16. The system of claim 9, wherein extracting time and frequency patterns comprises temporal data mining.

17. The system of claim 9, wherein the machine learning model comprises a neural network.

18. A method for temporal data mining utilizing a processor to execute instructions of a software module and a database comprising time series data;
    executing genetic algorithm instructions, comprising:
    a binning and classifying module;
    a data embedding module that extracts quantity or quality features from the data;
    a temporal pattern extraction module that extracts samples including temporal and useful patterns of data that can be used for modeling, estimation, prediction and/or analysis of data features; and
    a neural network training module;
    processing the temporal and useful patterns of data by the genetic algorithm instructions by training the neural network training module to represent the temporal and useful data patterns; and
    Generating prediction output, wherein the temporal and useful patterns include information that is used to optimize a manufacturing system or process.

19. The system of claim 18 wherein the genetic algorithm includes evaluation of a fitness function to provide a fitness value, and propagates to a set of next generation chromosomes with higher fitness values over a set of chromosomes with lower fitness values.

20. The method of claim 18 wherein a neural network trained in the neural network training module predicts a downtime, frequency, or mean time to repair event of a machine station in a production facility.

* * * * *